(12) United States Patent
Huo et al.

(10) Patent No.: US 9,513,389 B2
(45) Date of Patent: Dec. 6, 2016

(54) COUPLED TIME-DISTANCE DEPENDENT SWEPT FREQUENCY SOURCE ACQUISITION DESIGN AND DATA DE-NOISING

(75) Inventors: Shoudong Huo, Dhahran (SA); Hai Xu, Dhahran (SA); Peter I. Pecholcs, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 1178 days.

(21) Appl. No.: 13/468,627

(22) Filed: May 10, 2012

(65) Prior Publication Data
US 2012/0290214 A1 Nov. 15, 2012

Related U.S. Application Data

(60) Provisional application No. 61/485,737, filed on May 13, 2011, provisional application No. 61/605,501, filed on Mar. 1, 2012.

(51) Int. Cl.
G01V 1/28 (2006.01)
G01V 1/00 (2006.01)

(52) U.S. Cl.
CPC ............... *G01V 1/28* (2013.01); *G01V 1/005* (2013.01)

(58) Field of Classification Search
USPC .......................................................... 702/16
See application file for complete search history.

(56) References Cited

U.S. PATENT DOCUMENTS

| 5,721,710 A | 2/1998 | Sallas |
| 5,924,049 A | 7/1999 | Beasley et al. |
| 6,545,944 B2 | 4/2003 | De Kok |
| 6,614,717 B1 | 9/2003 | Khan |
| 6,906,981 B2 | 6/2005 | Vaage |

(Continued)

FOREIGN PATENT DOCUMENTS

| EP | 2184618 | 5/2010 |
| GB | 1112651 | 5/1988 |
| GB | 2387226 | 8/2003 |

OTHER PUBLICATIONS

Akerberg, P., G, Hampson, J. Rickett, H. Martin, and J. Cole, 2008, Simultaneous source separation by sparse radon transform: 78th Annual International Meeting, SEG, Expanded Abstracts, 2801-2805.

(Continued)

*Primary Examiner* — Mohamed Charioui
(74) *Attorney, Agent, or Firm* — Bracewell LLP; Constance G. Rhebergen; Albert B. Kimball, Jr.

(57) ABSTRACT

Acquisition of data by managing crosstalk interference with sector designs and unique sweeps is conducted and the resultant data are processed in 3D common receiver domain to attenuate crosstalk noise while preserving the signals for high source and receiver density acquisition designs. High-amplitude spectral amplitudes are attenuated and inter-ensemble statics or structural time delays are applied to achieve optimum filter performance. If the spectral amplitudes have been attenuated to a level consistent with non-simultaneous acquisition, conventional surface consistent processing can be performed to correct for statics and amplitude variations. A 3-point filter in different frequency bands may then be applied to remove any remaining residual crosstalk noise.

7 Claims, 35 Drawing Sheets

(56) References Cited

U.S. PATENT DOCUMENTS

| | | | | |
|---|---|---|---|---|
| 2006/0250891 | A1* | 11/2006 | Krohn | G01V 1/005 367/38 |
| 2007/0195644 | A1* | 8/2007 | Marples | G01V 1/005 367/39 |
| 2009/0010103 | A1 | 1/2009 | Sallas et al. | |
| 2009/0323472 | A1* | 12/2009 | Howe | G01V 1/003 367/41 |
| 2010/0080081 | A1 | 4/2010 | Morgan et al. | |
| 2010/0085836 | A1* | 4/2010 | Bagaini | G01V 1/005 367/41 |
| 2010/0299070 | A1 | 11/2010 | Abma | |
| 2010/0302900 | A1* | 12/2010 | Tenghamn | G01V 1/38 367/20 |

OTHER PUBLICATIONS

Bagani, C., 2006, Overview of simultaneous Vibroseis acquisition methods: 76th Annual International Meeting. SEG, Expanded Abstracts, 70-74.

Beasley, C. J., Chamber, R.E., and Jiang, Z., 1998, A new look at simultaneous sources: 68th Annual International Meeing, SEG, Expanded Abstract, 133-135.

Berkhout, A. J., Blacquiere, G. and Verchuur, D.J., 2008, From simultaneous shooting to blended acquisition: 78th Annual International Meeting, SEG, Expanded Abstracts, 2831-2838.

Berkhout, A. J., 2008, Changing the mindset in seismic data acquisition. The Leading Edge, 27, No. 7, 924-938.

Hampson, G., Stefani, J.G., and Herkenhoff, E.F., 2008, Acquisition using simultaneous sources: The Leading Edge, 27, 918-923.

Huo, S., Luo, Y. and Kelamis, P.G., 2009, Simultaneous sources separation via multi-directional vector-median filter. 79th Annual International Meeing, SEG, Expanded Abstracts, 31-35.

Howe, D., Foster, M., Allen, T., Taylor, B. and Jack, I., 2008, Independent simultaneous sweeping—a method to increase the productivity of land seismic crews. 78th Annual International Meeting, SEG, Expanded Abstracts, 2826-2830.

Howe, D., Foster, M., Allen, T., Taylor, B., Jack, I., Buddery, D., Choi, A., Abma, R., Manning, T., and Pfister, M. , 2009, Independent simultaneous sweeping—full scale implementation and new developments. 79th Annual International Meeting, SEG, Expanded Abstracts, 109-111.

Moore, I., Dragoset, B., Ommundsend, T., Wilson, D., Ward, C., and Eke, D., 2008, Simultaneous source separation using dithered sources: 78th International Meeting, SEG, Expanded Abstracts, 2806-2810.

Pecholcs, P.I., Lafon, S.K., Al-Ghamdi, T., Al-Shammery, H., Kelamis, P.G., Huo, S., Winter, O., Kerboul, J.B. and Klein, T., 2010, Over 40,000 vibrator points per day with real-time quality control: opportunities and challenges. 80th Annual International Meeting, SEG, Expanded Abstracts, 111-115.

Spitz, S., Hampson, G., and A. Pica, 2008, Simultaneous source separation: a prediction-subtraction approach: 78th Annual International Meeting, SEG, Expanded Abstracts, 2811-2815.

Bagani, C., 2006, Enhancing the low-frequency content of Vibroseis data. 75th Annual International Meeting, SEG, Expanded Abstracts, 75-79.

Bouska, J., 2009, Distance separated simultaneous sweeping: Efficient 3D Vibroseis acquisition in Oman: 79th Annual International Meeting, SEG, Expanded Abstracts, 1-5.

Matheny, P., Sambell, R., Mahrooqi, S., Yrubi, S. and Abri, S., 2009, Evolution of the land seismic super crew: 79th Annual International Meeting, SEG, Expanded Abstracts, 81-85.

Ongkiehong, L., and Askin, H.J., 1988, Towards the universal seismic acquisition technique: First Break, 06, No. 02, 46-63.

Rozemond, J.H., 1996, Slip-Sweep acquisition: 66th Annual International Meeting, SEG, Expanded Abstracts, 64-67.

Vermeer, G.J.O., 2002, 3D seismic survey design: Soc. Expl. Geophys, (2002) Chapter 3, pp. 11-26, Chapter 4, pp. 43-46; pp. 62-65.

Huo, S., Tsingas, C., and Kelamis, P.G., Xu, H., and Pecholcs, P., 2011, Deblending the Simultaneous Source Blended Data, SPE/DGS Saudi Arabia Section Technical Symposium and Exhibition, May 15-18, 2011.

PCT/US12/37290 Search Report and Written Opinion mailed Oct. 15, 2012.

PCT/US12/37277 Search Report and Written Opinion mailed Oct. 2, 2012.

Co-pending U.S. Appl. No. 13/468,550, filed May 10, 2012.

* cited by examiner

TIME (s)

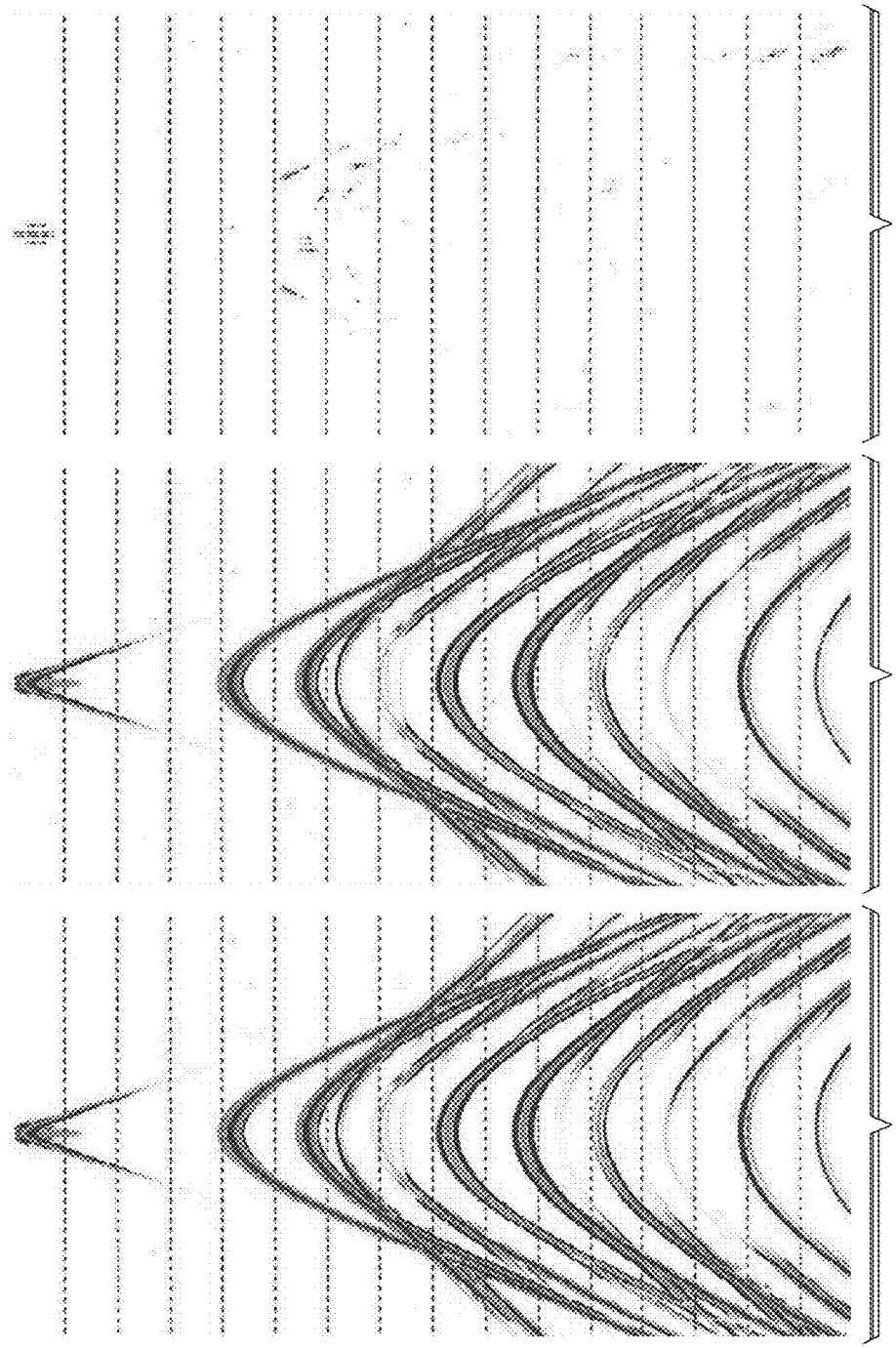

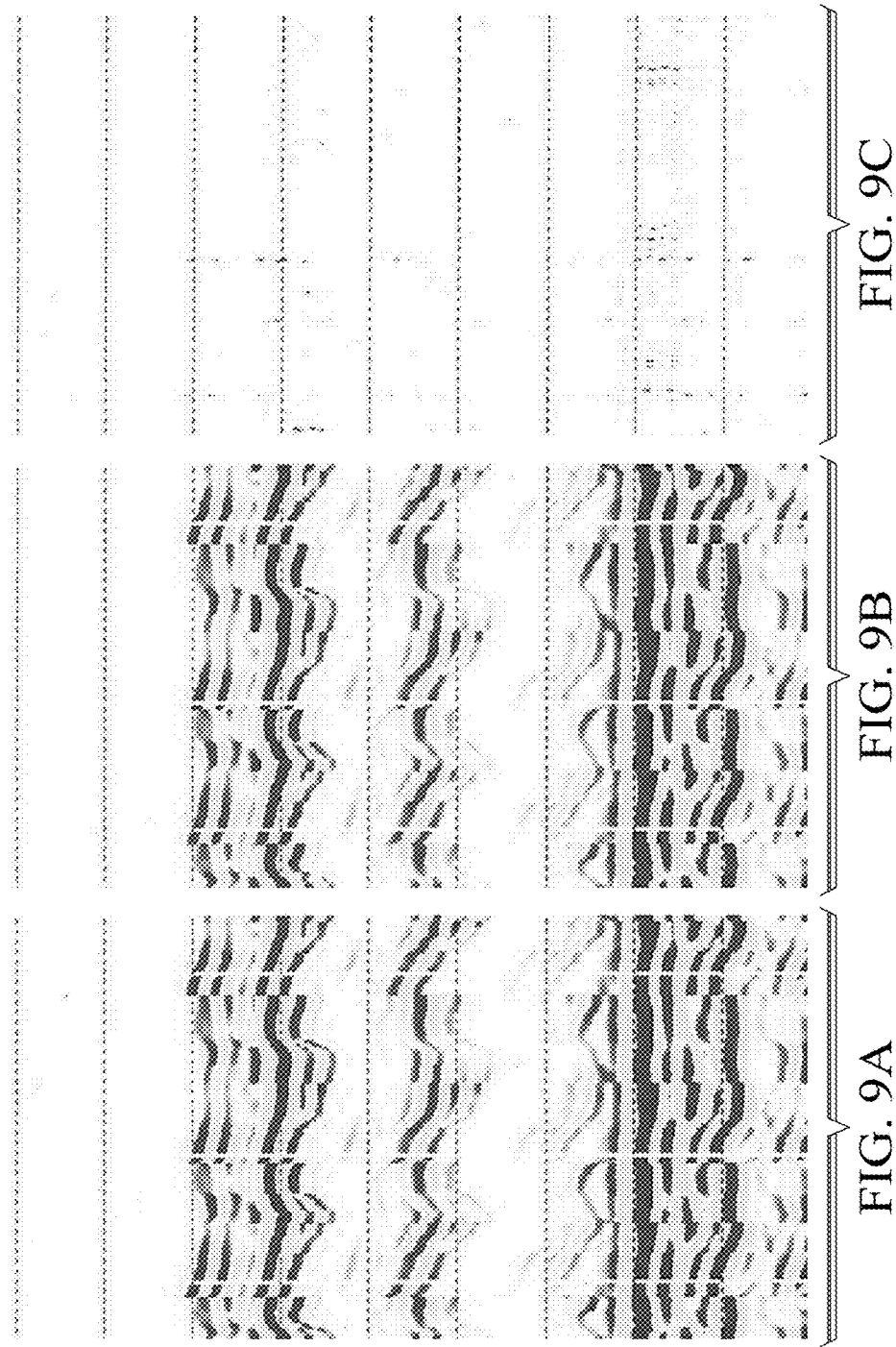

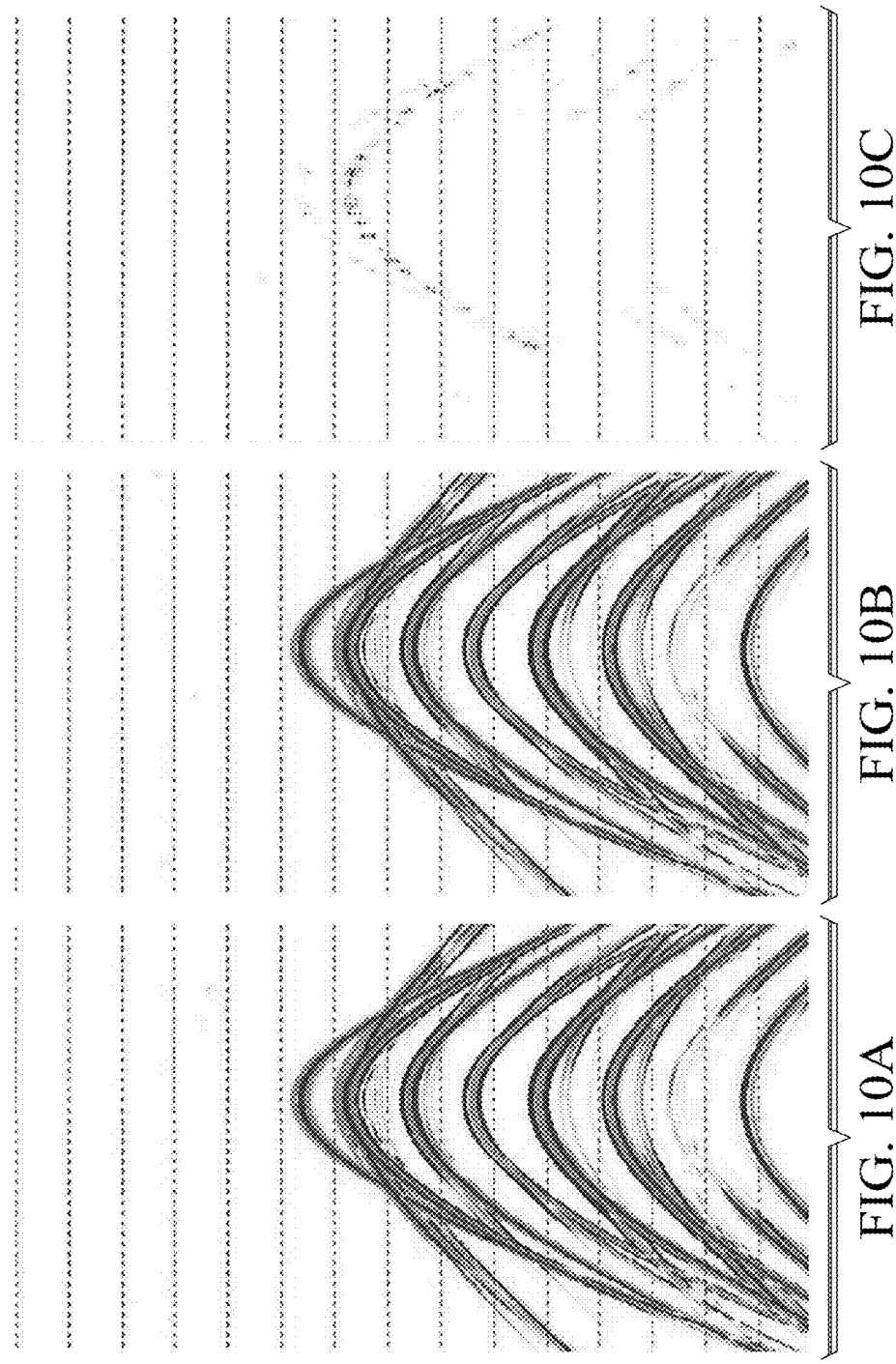

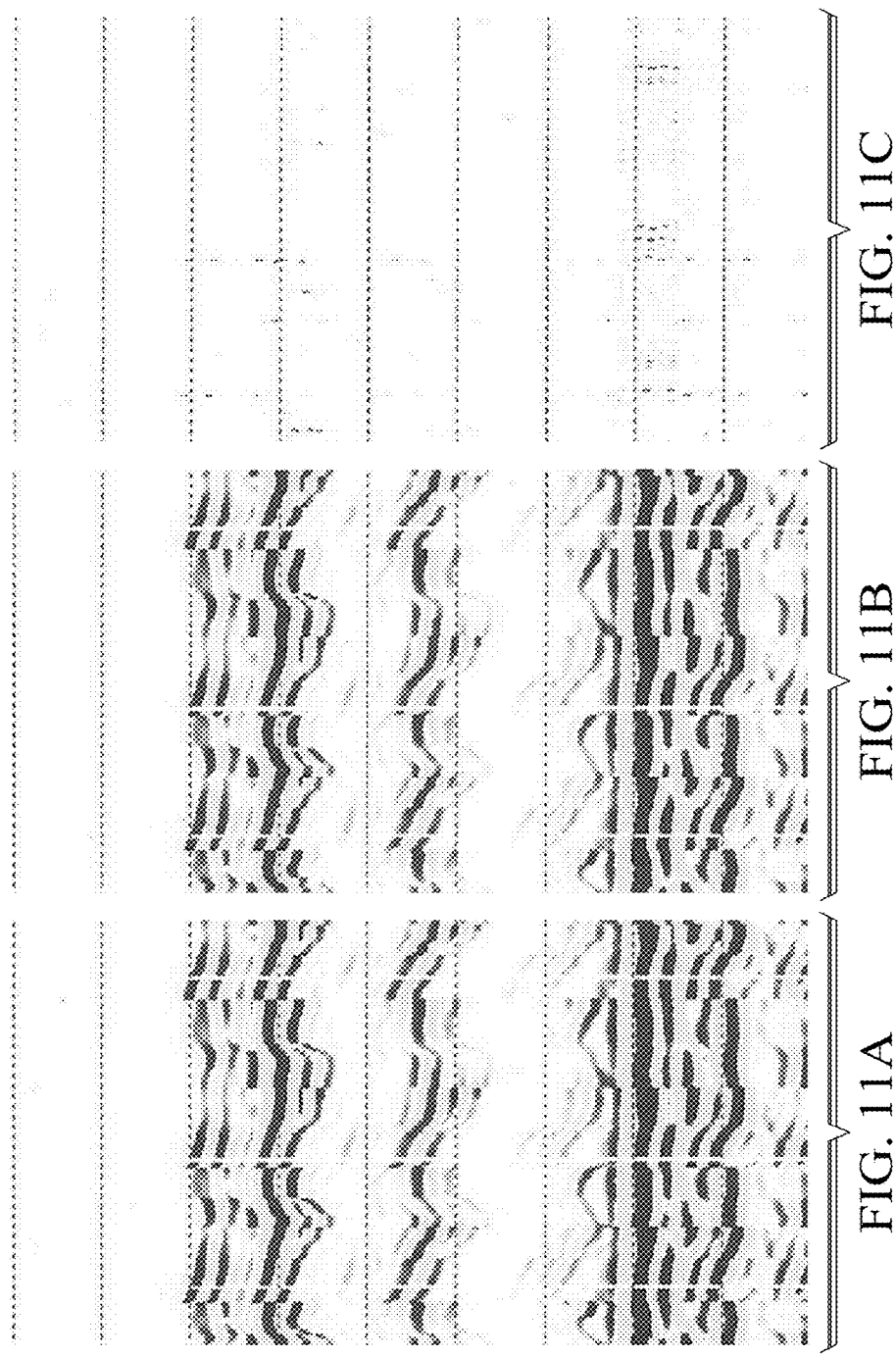

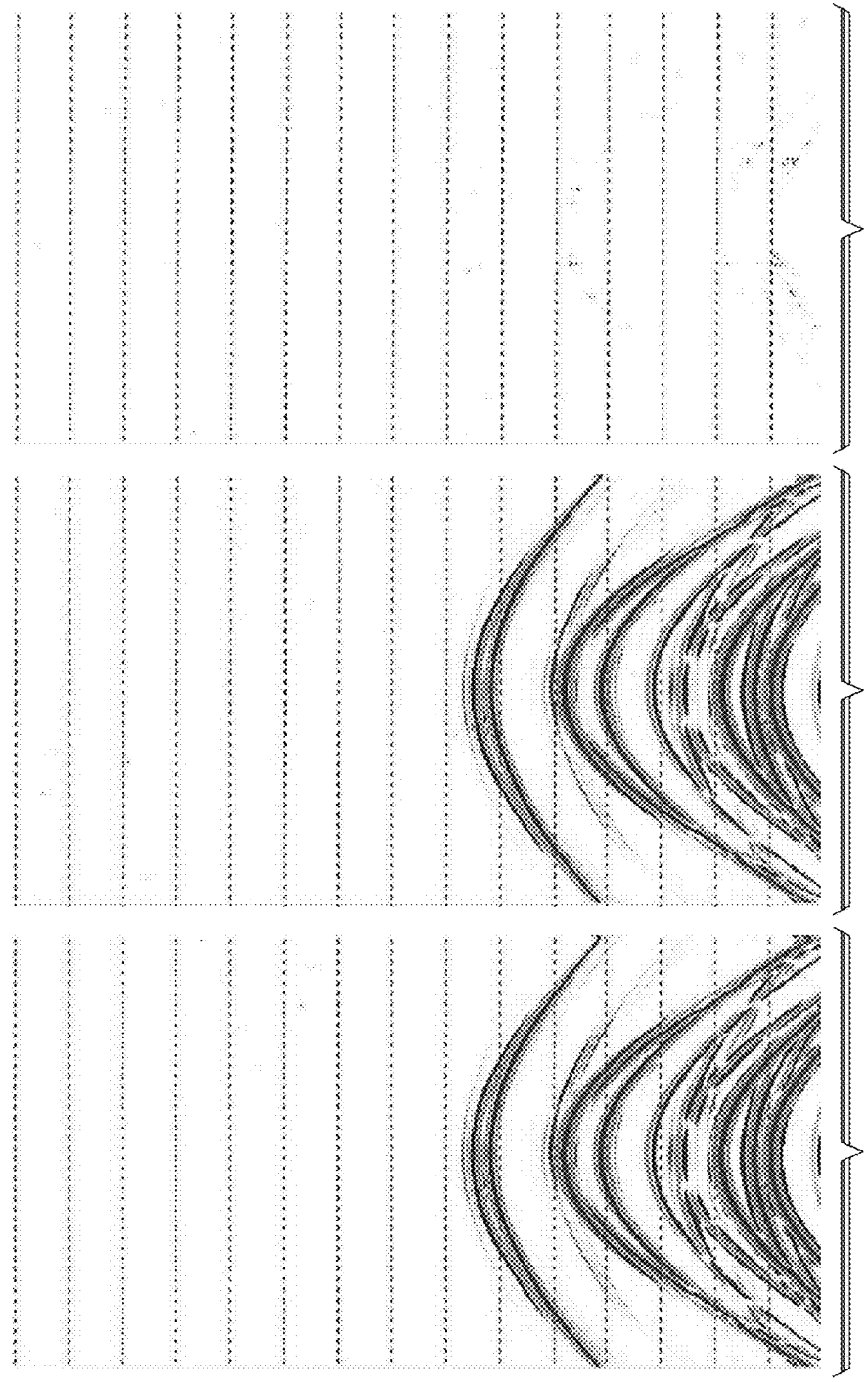

FIG. 25A
FIG. 25B
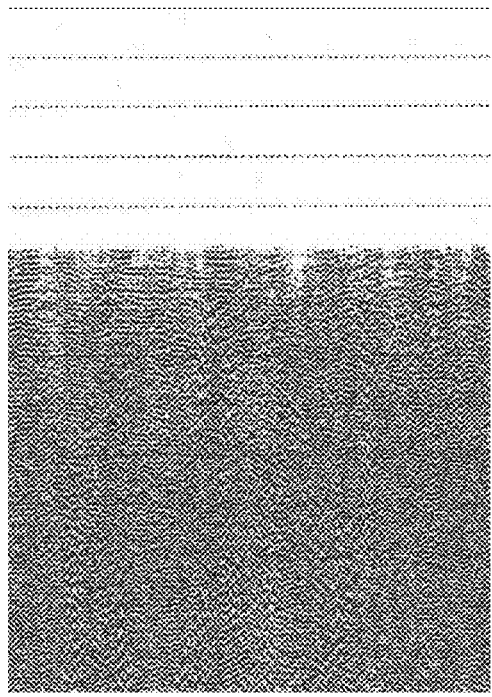
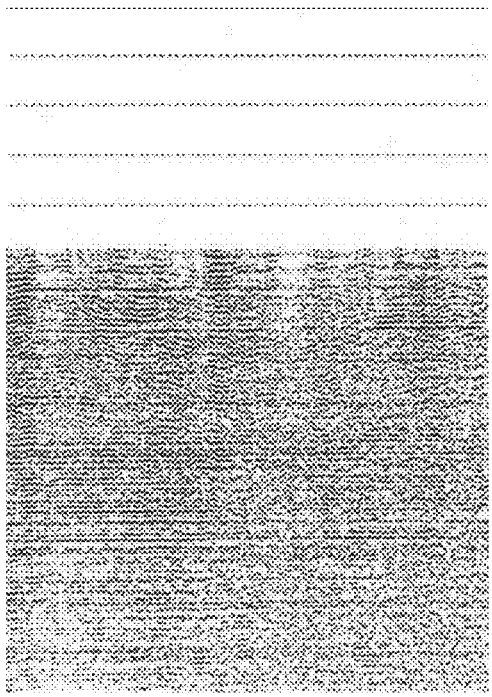
FIG. 26A
FIG. 26B
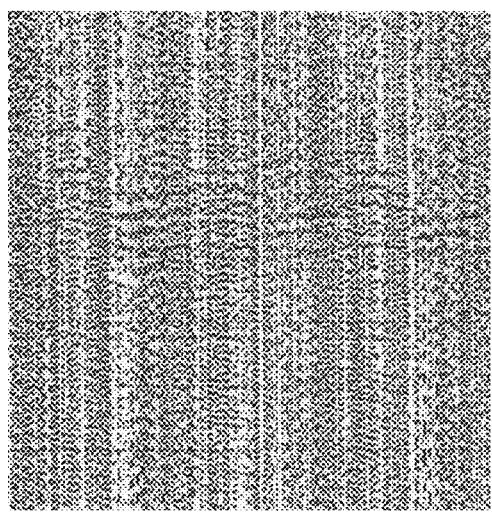
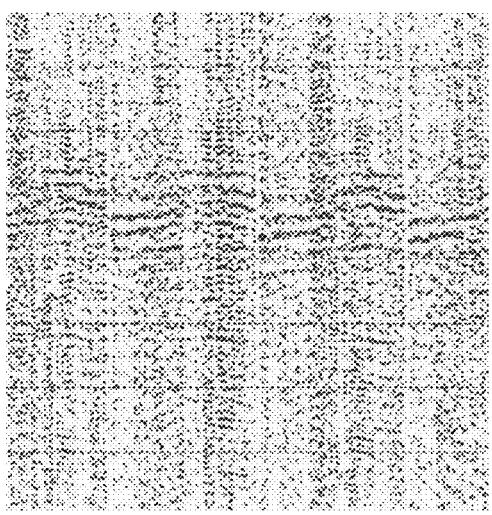

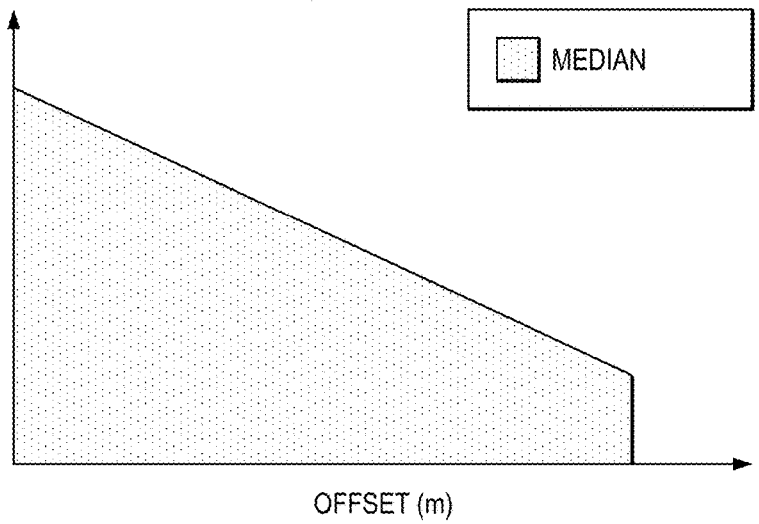
FIG. 37A  LINEAR OFFSET DEPENDENT
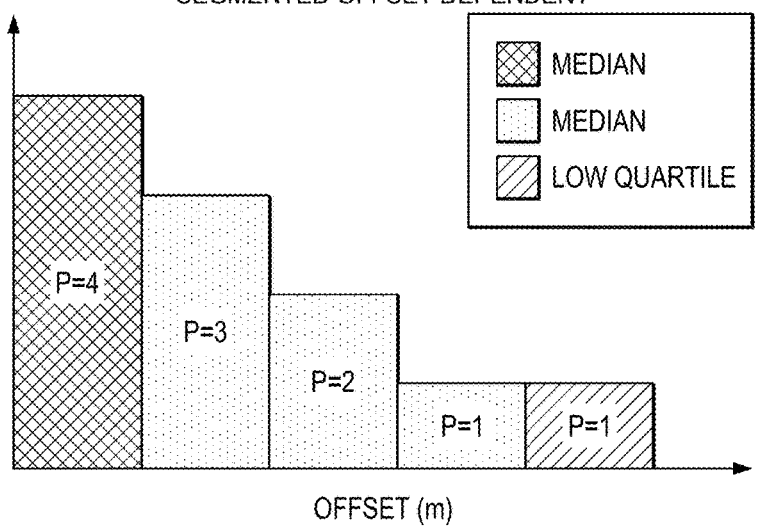
FIG. 37B  SEGMENTED OFFSET DEPENDENT

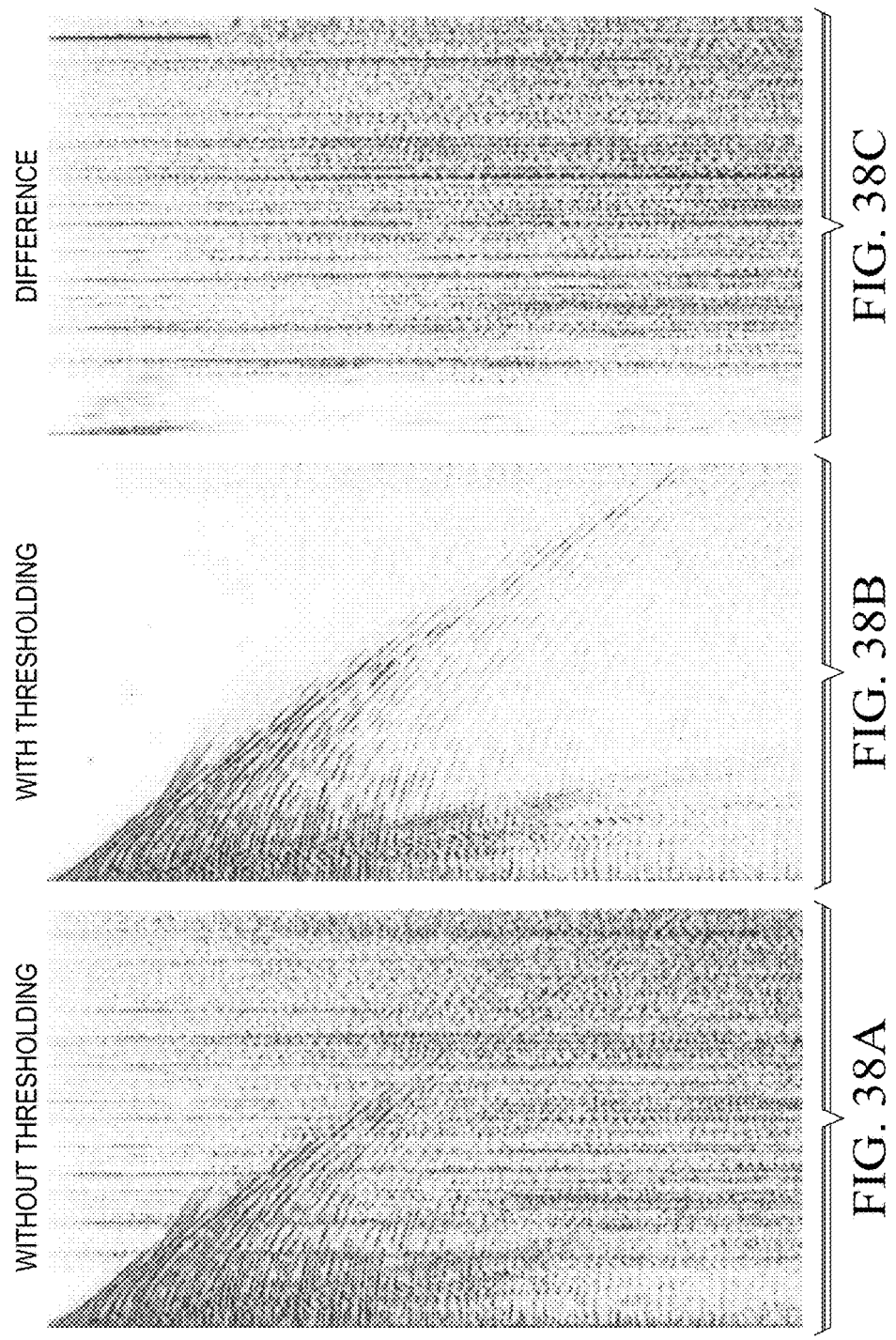

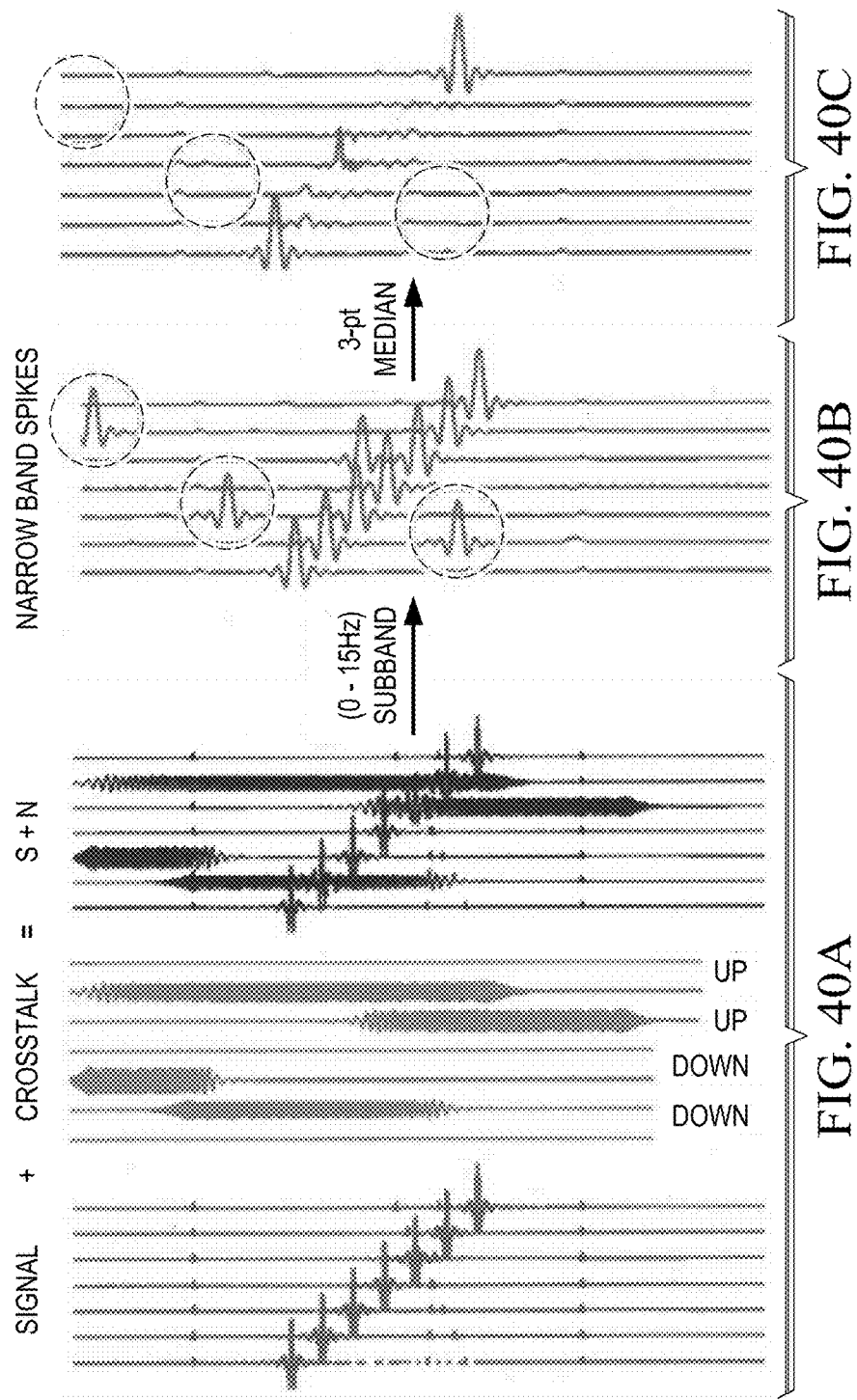

COUPLED TIME-DISTANCE DEPENDENT SWEPT FREQUENCY SOURCE ACQUISITION DESIGN AND DATA DE-NOISING

CROSS-REFERENCE TO RELATED APPLICATIONS

This application claims priority and is related to U.S. Provisional Patent Application No. 61/485,737 filed May 13, 2011 titled, "COUPLED TIME-DISTANCE DEPENDENT SIMULTANEOUS SWEPT FREQUENCY SOURCE ACQUISITION DESIGN AND DATA DEBLENDING," and U.S. Provisional Patent Application No. 61/605,501 filed Mar. 1, 2012 titled, "COUPLED TIME-DISTANCE DEPENDENT SWEPT FREQUENCY SOURCE ACQUISITION DESIGN AND DATA DE-NOISING" each of which is incorporated by reference in its entirety.

The present invention relates to processing of seismic data obtained in surveys with multiple swept frequency vibratory sources, as does commonly owned U.S. Non-Provisional patent application Ser. No. 13/468,550 filed of even date herewith and titled, "FREQUENCY-VARYING FILTERING OF SIMULTANEOUS SOURCE SEISMIC DATA", of which two of applicants are named as inventors.

BACKGROUND OF THE INVENTION

1. Field of the Invention

The present invention relates to conduct and organization of land seismic surveys where multiple swept frequency vibratory sources are operating in various sectors of an area of interest, and to processing of seismic data obtained in such surveys.

2. Description of the Related Art

To achieve a high-resolution land seismic image from surface to the deepest target of interest requires a surface sampling grid that records unaliased elastic waves. If we consider a 5 m spatial sampling grid with a 6000 m aperture, this would require approximately 600,000 active channels. This receiver configuration is currently not economic or practical. This limitation can be overcome by shooting outside a maximum channel constrained receiver spread (10,000 to 100,000 channels) with multiple vibroseis fleets at the expense of increasing the total acquisition time by the vibration point (VP) repetition factor. Using new vibrator source control technology, the total acquisition time can be significantly reduced using new high-productivity vibroseis methods. The most productive method is what is known as the independent simultaneous sweep. One available service according to the independent simultaneous sweep method is that provided under the trademark ISS® of BP p.l.c. of the U. K. There is, however, a risk of interference between vibroseis sources when their initiation times are nearly the same, or what is known as near-simultaneous sweeps. High productivity vibroseis survey methods also offer the risk during the survey of interference between signals from vibroseis trucks when they are positioned close to one another.

During the survey preplan process, land fleets, also known as survey crews, are pre-assigned GPS coordinates and during operations sweep independently without knowledge of the surrounding fleet positions. The seismic observer in the recording truck can visually see the position of all fleet positions and use radio communication to optimize movement of all fleets. This is significant in areas with many obstructions. It is not practical to pre-survey every vibration point for high productivity surveys because of their close spacing, such as in a 25 m grid. A survey crew member known as a vibrator pusher is located in a survey vehicle and helps guide the fleet in the field. Both the vibrator driver and pusher have a GPS monitor which helps guide them from one VP to the next. Radio communication with the observer helps to zoom into digital terrain maps and provide on the ground guidance. If the vibroseis fleets are not separated by a large distance, the high energy surface wave and signal crosstalk interference mask the reflection signals.

Crosstalk occurs when there are other sources firing at different times and the energy arrives during the listen time for a vibroseis source. For the Independent Simultaneous Sources (ISS®) acquisition technology, the crosstalk is interference from other sources, and depends both on the time of initiation and distance separation. Often, the crosstalk can be severe due to the elimination of listening time as shown below in FIG. 2. Conventional sparse acquisition designs and seismic data processing algorithms do not, so far as is known, provide a capability to deblend the crosstalk interference below the signal level.

Broadband, high-channel count onshore seismic acquisition systems with the capability to quickly and efficiently acquire high-source and receiver density surveys offer new opportunities to improve seismic data quality. Acquisition systems with the capability of continuously recording very wide receiver super-spreads with time-distance rules for source initiation can implement both conventional flip-flop and slip-sweep productivity methods, and more recent high-productivity innovations including Distance-Separated-Simultaneous-Source (DS3), Distance-Separated-Simultaneous-Slip-Sweep (DS4) and Independent Simultaneous Sources (ISS®).

The choice of non-aggressive or aggressive time-distance rules depends on the ability of processing technology to suppress harmonic and crosstalk interference. The lowest risk of crosstalk and harmonic interference is achieved with flip-flop, DS3 or DS4 methods. Flip-flop acquisition is a 'time-only' rule with minimum time separation equal to the vibrator sweep plus recording listen time. DS3 acquisition is a 'distance-only' rule which allows one or more source fleets to start simultaneously as long as they are separated by some specified minimum distance such that crosstalk occurs outside the recording listen time. DS4 acquisition is a 'time-and-distance' rule which allows one or more source fleets to start simultaneously as long as they are all separated by some specified minimum distance and minimum slip-time.

SUMMARY OF THE INVENTION

Briefly, the present invention provides a new and improved computer implemented method of processing data obtained from seismic surveys of subsurface formations with emission by multiple swept frequency seismic energy sources for reception as blended source records at seismic receiver arrays in sectors of an area of interest. The blended source records are sorted in the time-distance domain to a common gather, and common offset trace ensembles are formed of the common gather sorts of the blended source records. The common trace ensembles are transformed from the time-distance domain to the frequency-space domain, and a filter applied to frequency samples of the traces in the frequency-space domain to form a signal spectral model. The filtered traces are transformed from the frequency-space domain to the time-distance domain, and the transformed filtered traces are stored as deblended common source records for the individual ones of the swept frequency seismic energy sources.

The present invention also provides a new and improved data processing system for processing data obtained from seismic surveys of subsurface formations with emission by multiple swept frequency seismic energy sources for reception as blended source records at seismic receiver arrays in sectors of an area of interest. The data processing system includes a processor which performing the steps of sorting the blended source records in the time-distance domain to a common gather, and forming common offset trace ensembles of the common gather sorts of the blended source records. The processor also transforms the common trace ensembles from the time-distance domain to the frequency-space domain, and applies a filter to frequency samples of the traces in the frequency-space domain to form a signal spectral model. The processor transforms the filtered traces from the frequency-space domain to the time-distance domain, and stores the transformed filtered traces as deblended common source records for the individual ones of the swept frequency seismic energy sources. The data processing system also includes a display which forms an output display of selected deblended source common source records.

The present invention also provides a new and improved data storage device having stored in a computer readable medium computer operable instructions for causing a data processing system in processing data obtained from seismic surveys of subsurface formations with emission by multiple swept frequency seismic energy sources for reception as blended source records at seismic receiver arrays in sectors of an area of interest. The data storage device contains instructions for causing the data processing system to perform the steps of sorting the blended source records in the time-distance domain to a common gather, and forming common offset trace ensembles of the common gather sorts of the blended source records. The data storage device also contains instructions for causing the data processing system to perform the steps of transforming the common trace ensembles from the time-distance domain to the frequency-space domain and applying a filter to frequency samples of the traces in the frequency-space domain to form a signal spectral model. The data storage device also contains instructions for causing the data processing system to perform the steps of transforming the filtered traces from the frequency-space domain to the time-distance domain; and storing the transformed filtered traces as deblended common source records for the individual ones of the swept frequency seismic energy sources.

The present invention also provides a new and improved method of land surveying of subsurface formations in an area of interest with emission by a plurality of survey fleets of a plurality of swept frequency seismic energy sources for reception as blended seismic records at a receiver spread of seismic energy receiver arrays in sectors of the area of interest. The surveying method of the present invention locates the survey fleets in different individual sectors across separate source swaths outside the receiver spread, and performs linear frequency sweeps at frequencies for individual survey fleets at different frequency ranges in a common bandwidth from the frequency ranges in the common bandwidth of the other survey fleets. The survey method of the present invention performs the linear frequency sweeps for the sources in the individual survey fleets of the plurality of survey fleets for sweep lengths of different times from the other sources in the same individual survey fleet, and forms a blended seismic record at the receiver spread of linear frequency sweeps from the concurrently operating survey fleets.

BRIEF DESCRIPTION OF THE DRAWINGS

FIG. 8A is a display of a common-source record of near-offset input data from the model of FIG. 6.

FIG. 8B is a display of the common-source record of near-offset input data of FIG. 8A as output data after processing according to the present invention.

FIG. 8C is a display of the difference between the input data of FIG. 8A and the output data of FIG. 8B.

FIG. 9A is a display of a mid-offset cross-spread common-source ensemble of input data from the model of FIG. 6.

FIG. 9B is a display of the mid-offset cross-spread common-source ensemble input data from the model of FIG. 9A as output data after processing according to the present invention.

FIG. 9C is a display of the difference between the input data of FIG. 9A and the output data of FIG. 9B.

FIG. 10A is a display of a common-source record of mid-offset input data from the model of FIG. 6.

FIG. 10B is a display of the common-source record of mid-offset input data of FIG. 10A as output data after processing according to the present invention.

FIG. 10C is a display of the difference between the input data of FIG. 8A and the output data of FIG. 10B.

FIG. 11A is a display of a far-offset cross-spread common-source ensemble of far-offset input data from the model of FIG. 6.

FIG. 11B is a display of the far-offset cross-spread common-source ensemble of far-offset data of FIG. 11A as output data after processing according to the present invention.

FIG. 11C is a display of the difference between the input data of FIG. 11A and the output data of FIG. 11B.

FIG. 12A is a display of a common-source record of far-offset input data from the model of FIG. 6.

FIG. 12B is a display of the common-source record of far-offset input data of FIG. 12A as output data after processing according to the present invention.

FIG. 12C is a display of the difference between the input data of FIG. 12A and the output data of FIG. 12B.

FIGS. 25A and 25B are plots of a common-midpoint stack for mid-offset survey data before and after, respectively, processing according to the present invention.

FIGS. 26A and 26B are plots a pre-stack common-offset ensemble for far-offset survey data before and after, respectively, processing according to the present invention.

FIGS. 37A and 37B are schematic diagrams of two offset-dependent frequency thresholding strategies.

FIGS. 38A and 38B are plots of an absolute offset stacked common receiver gather from a survey before and after, respectively, offset dependent frequency thresholding, and FIG. 38C is a plot of their differences.

FIG. 40A is a display of a synthetic seismic signal and associated crosstalk or noise separately and combined together as data.

FIG. 40B is a display of uncompressed crosstalk noise in the data display of FIG. 40A.

FIG. 40C is a display of the crosstalk noise of FIG. 40B after application of a 3-point median filter to the data of FIG. 40A.

DETAILED DESCRIPTION OF THE PREFERRED EMBODIMENTS

Figure 1:
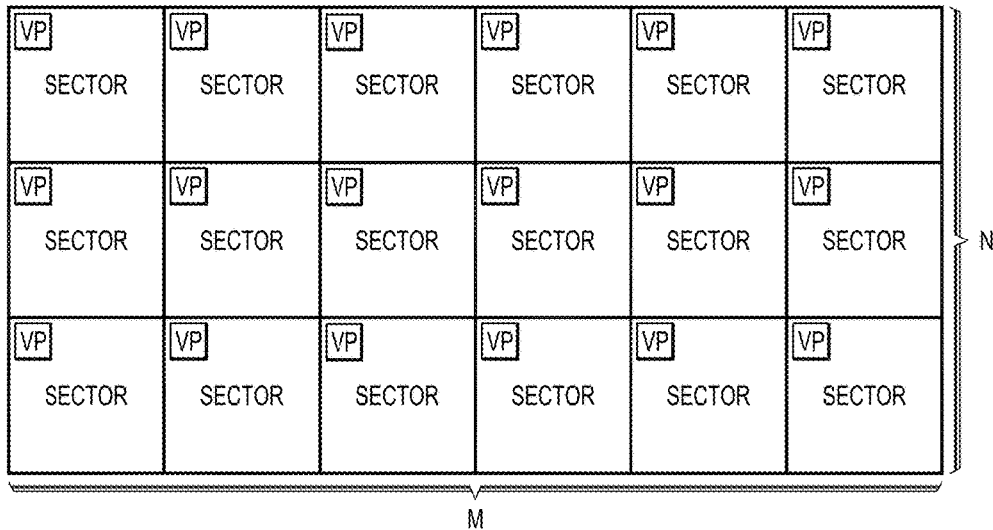
FIG. 1 is a schematic diagram of the grid assignment of source fleets to GPS coordinates within a sector.

The present invention provides a new self-managed near-simultaneous swept frequency survey method. The present invention manages the distribution of near-simultaneous crosstalk noise (SMSC—self-manage near-simultaneous crosstalk). The present invention controls the amount of crosstalk interference in both time and offset on all processing sorted domains: common-source, common-receiver, common-offset, cross-spread, and common-offset vector tile domains. Time-distance rules between fleets are used to control the random initiation timing of vibroseis sweeps and a minimum distance separation are imposed for simultaneous sweeps. Additional crosstalk interference attenuation is achieved by using unique linear sweeps for each fleet. Using different sweep lengths with the same bandwidth for each dependent fleet reduces the total energy of surface wave and signal crosstalk interference after cross-correlation by 30 dB and 20 dB, respectively.

The minimum distance rule for simultaneous sweeps is primarily used to minimize the interference of first break energy used for refraction statics analysis. If the first breaks are masked by crosstalk interference, the effect is minimal because the crosstalk noise wavelets are uncompressed chirp signals and arrive at random times. The time-distance rules which are used control of the energy and statistical properties of crosstalk interference in both time and offset. In this manner, the seismic data is preconditioned during acquisition for optimum crosstalk attenuation (deblending) in common-offset cross-spread (COXS) or common-offset common-receiver (inline, cross-line and common offset) (COCR) ensembles and common-offset vector tile volumes (COVT).

The crosstalk attenuation or deblending workflow processing involves two sets of seismic data preconditioning, followed by crosstalk attenuation. Crosstalk appears as a narrow band noise burst within a time-offset window. Cross-spread (XS) or common-receiver (CR) gathers with high-amplitude spectral outliers are first attenuated in the frequency-space (F-X) domain to a threshold level referenced to the signal spectrum. After the crosstalk noise level has been attenuated to within a user defined threshold level of the signal spectrum, normal moveout (NMO) is applied and sorted to COXS or COCR ensembles (incrementing by the minimum group interval).

Within each common-offset ensemble, the inter-ensemble structural dip or surface-consistent statics is estimated and applied as a pre-conditioning step to ensure that the reflection signals have zero dip. After this preconditioning step, the crosstalk interference appears randomly in time along different azimuths and a simple 3-point median filter is applied in the time-offset (T-X) domain to attenuate the uncompressed crosstalk noise. The 3-point median filter is applied to different frequency bands in the T-X domain and then summed to the full-bandwidth. With only a 3-point median filter, the reflection signal's amplitude and phase is preserved. The new dependent time-distance simultaneous swept frequency source acquisition design coupled with the new deblending processing offers a new cost-effective process to acquire and image high source and receiver density seismic data. Land seismic data signals and noise can now be recorded unaliased and processed to produce high resolution seismic images.

An acquisition system which supports flexible time-distance and shooting sequence rules can be designed during the preplan stage to optimize survey productivity. Critical components for the implementation of general acquisition rules are the source command-and-control and timing control systems and their integration with the acquisition system. These methods can be used in combination to achieve the greatest source density in a minimum amount of time (Table 1). When the source density is increased as compared to existing survey methods, the roll-rate (number of sensors moved per VP) can be maintained or reduced, having little or no impact on the productivity of the line crew.

TABLE 1

Simultaneous source time-distance separation rules and associated density.

| Source Separation | Distance | Time | Source Density |
|---|---|---|---|
| Flip-Flop | — | very good | low |
| Slip-Sweeps | — | average | average |
| DS3 | very good | — | average |
| DS4 | average | average | high |
| Rule Based Simultaneous Sources | average | average | highest |
| Independent Simultaneous Sources | poor | poor | highest |

The acquisition plan is another important element of the acquisition system control infrastructure. The relationship between each source location and its corresponding active recording spread must be incorporated in the total management of sources, receivers and labor prior to acquisition. When this is optimized, a higher source and receiver density land acquisition survey can be acquired in an equivalent amount of time and this leads to broader bandwidth higher resolution seismic images.

These high-productivity methods can be classified as non-aggressive and aggressive. Aggressive methods allow source records to be contaminated with energy from surrounding sources and must rely on seismic processing technology to remove this interference (crosstalk). Non-aggressive methods use a combination of time-distance rules to avoid such interference. For example, prior to the start of sweep initiation by the sources, the control system checks which vibrator fleets are in position and ready to sweep. From this set of fleets, the control system first calculates the distance separation between fleets. If they meet the minimum-distance separation rule, a command is sent to these fleets to sweep simultaneously or at random times with a pre-set standard deviation. After the sweep(s) have been initiated, the vibrator control system begins to search for the next set of fleets which are ready to sweep. And the sequence is repeated.

An additional time rule can be used to improve productivity. In this case, the vibrator control system requires that the fleets must pass both a minimum-distance and time rule. For example, if three fleets are ready to sweep with two meeting the minimum-distance rule from the previous sweep location and one does not meet the distance rule, the pair of vibrator fleets are allowed to sweep simultaneously and the third is caused to be delayed by a preset minimum delay time.

Field trials reveal that the recorder should allow each fleet to sweep when in ready position. Time-distance rules are no longer mandatory because they are imbedded in the design with pre-assigned GPS coordinates which create the distance rules and different sweep lengths per fleets which create the time rules. The deviation in vibrator driver speed has little or no impact on the distribution of crosstalk interference. Key parts in the design are assigned different sweep lengths for sectors outside the wide receiver spread. Sweep lengths should increase and increment by the minimum two-way time to the primary target. Sectors can be grouped to form a single cluster. Each cluster has a different set of sweep lengths but all increase in sweep length. During the acquisition design stage, the sectors are permuted after each production swath to increase the diversity of sweep lengths and crosstalk noise. The only command and control comes from the observer in the recording truck who communicates via radio to the vibrator pushers to help guide the drivers around obstacles. Radio communication is also needed for quality control of vibrator positions and sweep quality.

If desired, time-distance rules between survey fleets may be provided to control the level of crosstalk interference recorded on a high-density source and receiver sampling grid. In such cases, at the acquisition design stage a minimum symmetric sampling survey design is used, with a source and receiver line spacing of 100 m and source and receiver group interval of 25 m. Depending on the total number of available active channels and survey fleets, the time-distance rules are defined to minimize crosstalk interference.

The purpose of this sampling design and high-productivity method is to provide sufficient sampling density in COXS and COCR ensembles and control the random initiation timing of survey fleets. When these conditions are met, the new deblending processing can effectively attenuate the crosstalk interference below the signal level and the source and receiver seismic data of interest can then be processed using conventional production processing.

The first step in deblending or crosstalk attenuation is to sort the blended source records into the cross-spread or common-receiver domain. Using common-source (CS), common-receiver (CR), common-offset (CO) domain ensembles, or COVT domain-common offset vector tile domain, the inter-ensemble statics or structural dip is estimated and corrected prior to filtering. Afterwards, the seismic data in time-space (T-X) is transformed into the frequency-space (F-X) domain.

In the frequency-space (F-X) domain, high-amplitude spectral amplitude outliers are scaled down to a background spectral signal model. This operation preconditions the traces for optimum 3-point time domain median filtering. The median filter is applied to COXS or COCR traces with only a 3-point filter. This ensures that the filter only attenuates crosstalk interference and preserves the signal. These filters only work after surface consistent static and amplitude corrections have been applied. A time-frequency thresholding filter is first applied, then surface consistent processing and then the 3-point filters are used to make sure the signal is not attenuated.

Synthetic seismic data generated over a complex subsurface depth model confirms this result. When these processes are completed, the applied inter-ensemble statics or structural time delays are removed and the seismic data is sorted back to the CS domain producing source records virtually free of crosstalk interference. These high-density deblended source records are now available for conventional production seismic processing which will lead to higher spatial resolution seismic images.

The present invention begins at the acquisition survey design stage. The objective is to design a symmetrically sampled high-source and receiver density wide-azimuth survey that meets seismic imaging objectives from surface to deepest hydrocarbon target. Experience has shown that a minimum source and receiver group interval of 25 m and source and receiver line interval of 100 m is required to meet these objectives. Given these minimum requirements, the available resources are used to meet source and receiver sampling requirements for the present invention.

In practice, conventional flip-flop and non-aggressive slip-sweep methods cannot acquire these high-source and receiver density seismic surveys in a practical period of time. Therefore, the present invention is based on simultaneous source methods. The ISS® method is the highest productivity method but also has the highest level of crosstalk interference.

The present invention may also use a dependent time-distance rule based swept frequency productivity method. With time-distance acquisition rules, the amount of crosstalk interference on a source record in time and offset can be significantly attenuated. The first step is to assign vibrator survey fleets or crews to independent sectors. The size of each sector and number of fleets operating varies in size depending on the terrain conditions. In difficult terrain, the average moveup distance between VPs increases due to detours around obstacles. To compensate for this increase in moveup time, additional fleets can be assigned to the same sector to minimize the total acquisition time. Under these conditions, the conventional minimum-distance criteria would not be met, but a time rule is included to minimize crosstalk interference. These principles are applied to all sectors.

During the preplan stage, vibrator fleets are assigned GPS coordinates within a sector. The example of FIG. 1 illustrates an equal area sector preplan which can be applied in flat terrain conditions. FIG. 1 illustrates a simple N×M equal area sector example for a flat gravel plain where the average moveup time between VPs depends only on the skill of the driver. In this example, vibrator fleet drivers begin in the North-West corner of each sector separated by an equal minimal distance. Once production is initiated, the vibrator control system begins to manage the fleet operations using the preset time-distance rules as defined in the acquisition preplan.

Figure 2:
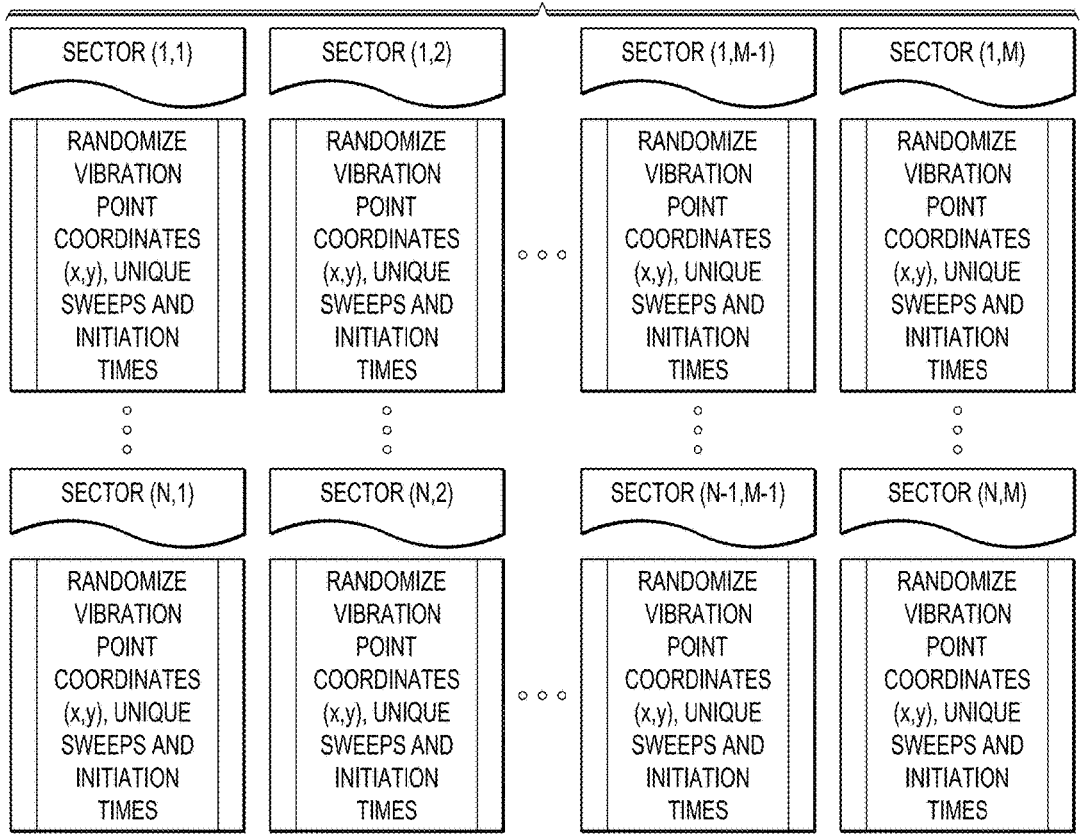
FIG. 2 is a schematic diagram of the assignment of GPS coordinates, sweep designs and GPS timing to source fleets.
Figure 3:
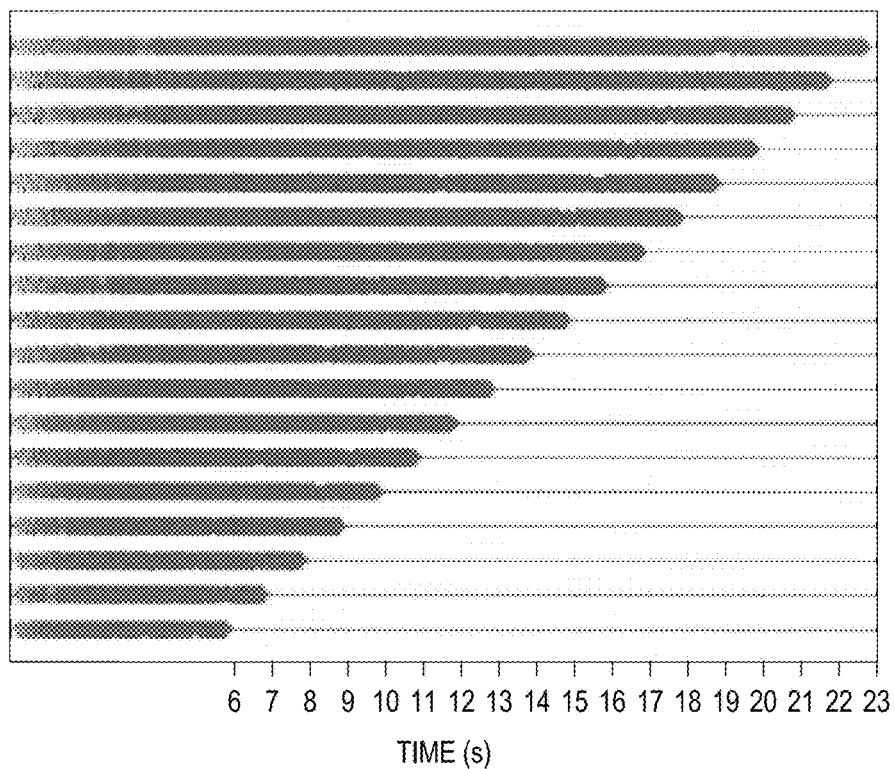
FIG. 3 is a display of multiple linear frequency sweeps having different sweep lengths within a common bandwidth.

FIG. 2 illustrates a simultaneous source preplan example for N×M sectors. During the preplan stage, vibrator fleets are assigned GPS coordinates, unique sweep designs and GPS timing. Source initiation time rules are also possible as an option. In addition, the magnitude of crosstalk interference is controlled by assigning a unique linear sweep to each fleet (FIG. 3). As shown in FIG. 3, eighteen unique linear sweeps are provided with the same bandwidth from 4 to 94 Hz and with sweep lengths from 6 to 24, increasing sequentially by 1 s for this purpose. When the linear sweeps have different sweep lengths, the interfering uncompressed crosstalk signals after correlation have the same properties as an uncorrelated pilot sweep (chirp signal).

The length of the corresponding crosstalk signals is equivalent to the sweep length difference between the correlation sweep pilot and the interfering sweep. It is to be noted that the crosstalk energy is spread over time in contrast to when a sweep signal is correlated with itself and the uncorrelated signals are compressed into a short wavelet (such as a Klauder wavelet).

Figure 4A:
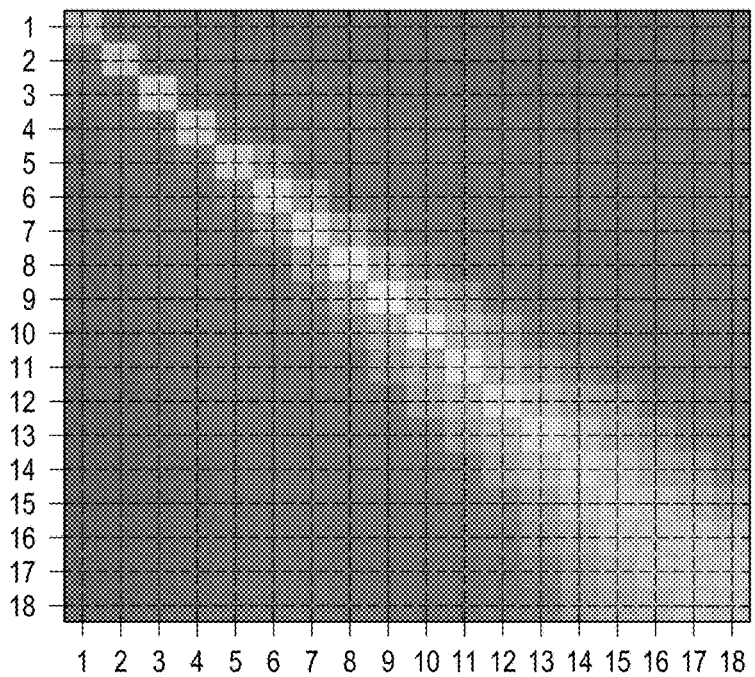
FIGS. 4A and 4B are displays of cross-correlation matrixes for signal and surface wave crosstalk.
Figure 4B:
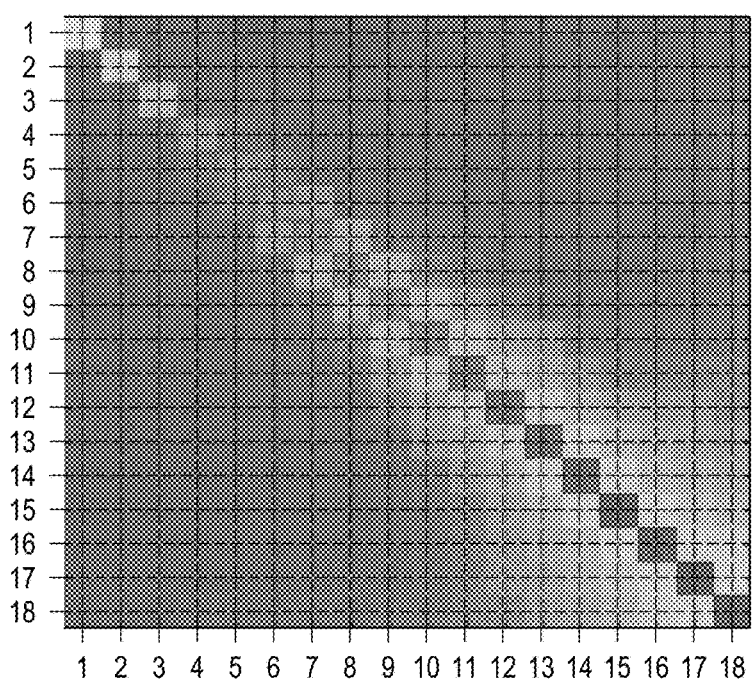

FIGS. 4A and 4B illustrate the benefits of using unique linear sweeps in different sectors. FIG. 4A depicts a maximum cross-correlation value matrix for signal and FIG. 4B depicts a maximum cross-correlation value matrix for surface wave crosstalk for 6 s to 24 s sweep lengths within the same bandwidth. With only one second difference in time, approximately 20 and 30 dB attenuation of signal and surface crosstalk interference can be seen to be obtained as compared to the autocorrelation of the signal.

The simultaneous survey data is recorded continuously in time and correlation can take place in near-real time or at a later stage. Prior to correlation, each uncorrelated source record is parsed from the continuous recording record based on the survey design source-receiver distance relations. After correlation, this acquired data is now preconditioned for processing according to the present invention.

Figure 5:
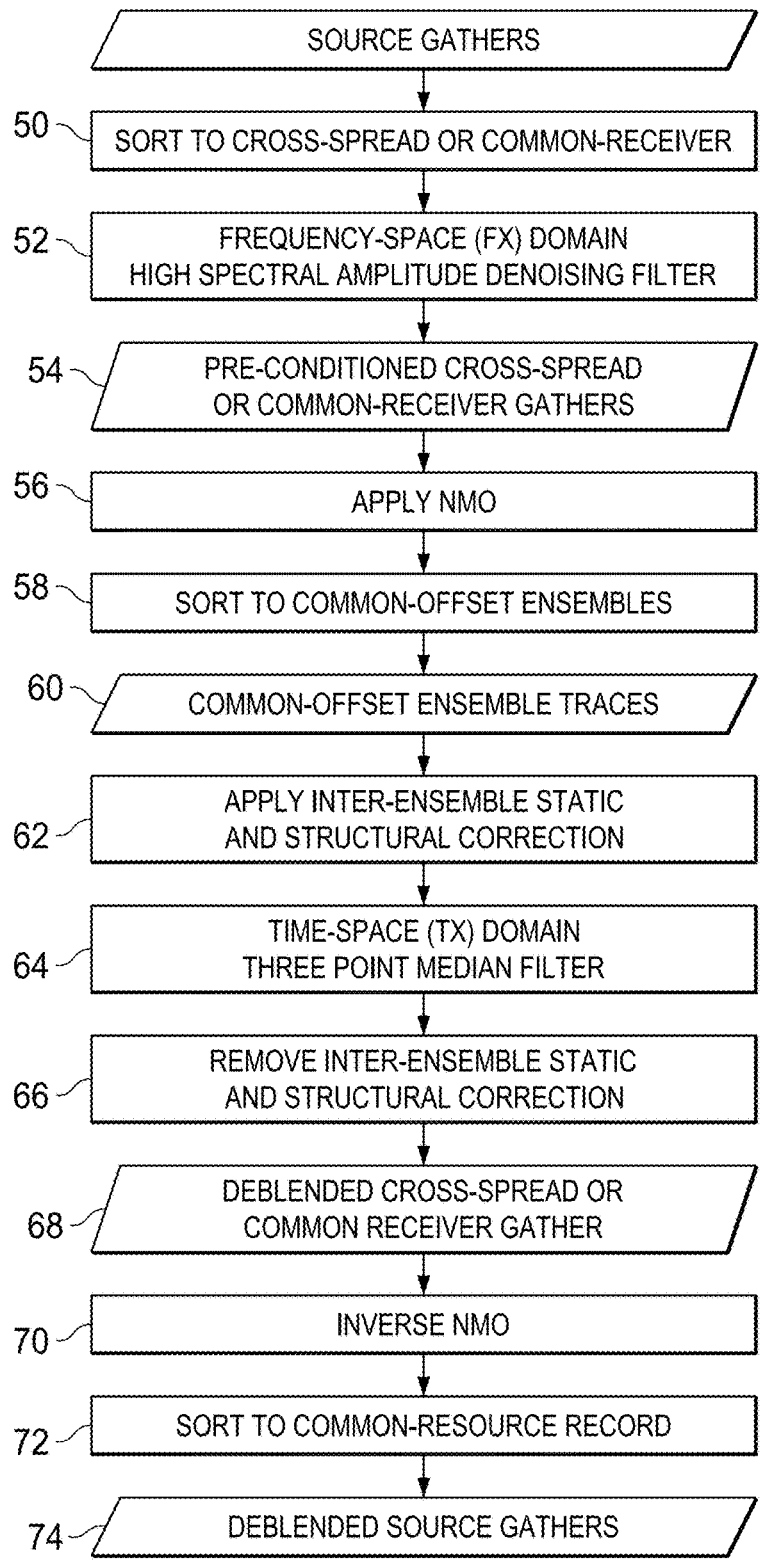
FIG. 5 is functional block diagram of a set of data processing steps performed in the computer system of FIG. 28 during the processing methodology according to the present invention.

FIG. 5 illustrates the deblending processing methodology from raw blended to deblended source records. The blended source records are first sorted during step 50 into cross-spread or common-receiver domains. After selecting one of these domains, the T-X traces are transformed to the F-X domain (Step 52). In the F-X domain, a median filter follow by a mean filter is applied to each frequency sample to derive an approximate signal spectral model. The next portion of Step 52 is to scale down the raw F-X amplitude spectral values to the derived signal spectral model. A user-defined threshold value can be assigned to scale the values above or below the signal spectral model as a function of frequency. The filtered traces are now transformed back to the T-X domain (Step 54). The filtering operation preconditions the seismic traces for median filtering. All high-amplitude spectral or time traces have been attenuated. Normal moveout (NMO) correction is then applied (Step 56).

As will be described below, the filtering during step 52 in a number of instances reduces the crosstalk noise to a level such that conventional processing can be applied to make the surface consistent static and amplitude corrections. After the corrections are made in these instances, it is not required to perform another filter that looks at dips in the common offset domains.

In other instances, a step (Step 58) may be used to sort the filtered cross-spread or common-receiver traces to common-offset ensembles (Step 60). In this domain, an inter-ensemble static or structural dip correction is applied (Step 62) to precondition the traces to meet the zero-dip requirement for median filtering. The static or structural time delays are saved so they can be removed after median filtering. Once the time delays have been applied, a 3-point median filter is applied (Step 64). The processing sequence is applied for each common-offset incrementing by the minimum source and group interval until the maximum offset is reached. At the completion of this process, the inter-ensemble time delay corrections are removed (Step 66) and cross-spread or common-receiver traces are obtained (Step 68). The traces resulting from step 68 are subjected to inverse NMO correction (Step 70) and are then sorted (Step 72) back to the common-source domain. The end result (Step 74) is a deblended source record virtually free of crosstalk interference.

Synthetic Proof of Concept

Figure 6:
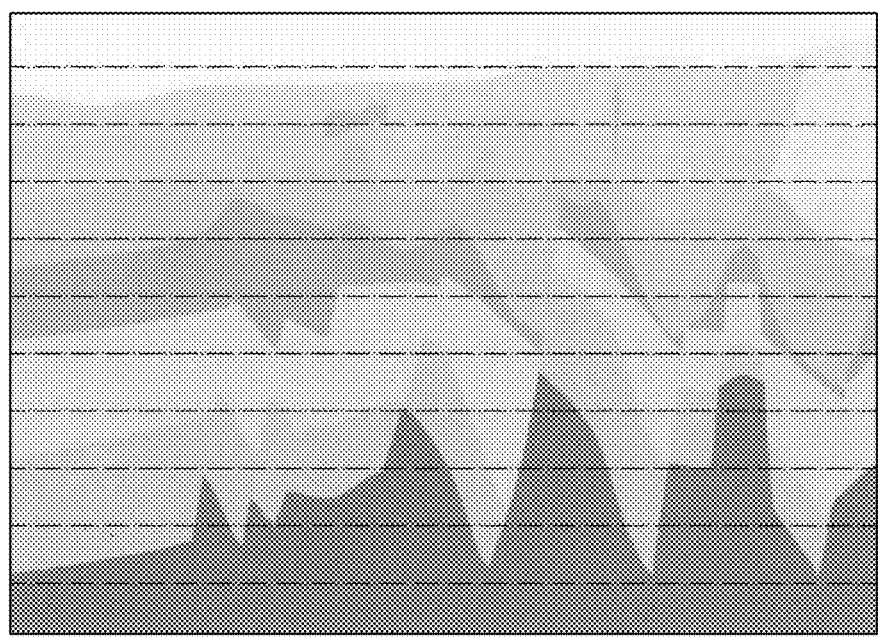
FIG. 6 is a display of a synthetic geologic model with complex structural dip used as a basis for data to be processed according to the present invention.
Figures 7A, 7B, 7C:
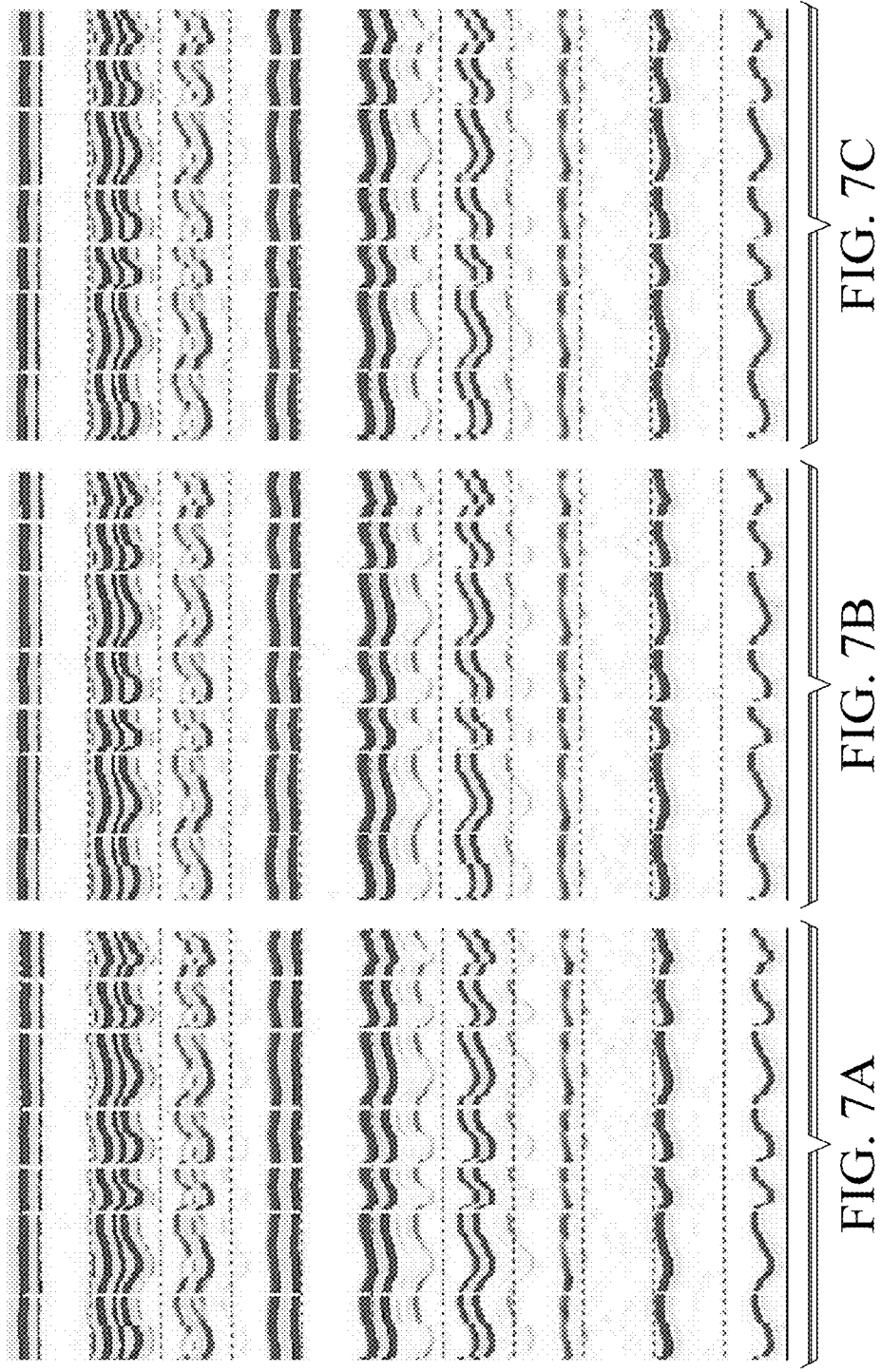
FIG. 7A is a display of a near-offset cross-spread common-source ensemble of near-offset input data from the model of FIG. 6.
FIG. 7B is a display of the near-offset cross-spread common-source ensemble of near-offset data of FIG. 7A as output data after processing according to the present invention.
FIG. 7C is a display of the difference between the input data of FIG. 7A and the output data of FIG. 7B.

The subject matter of the present invention has been tested on synthetic data from a geologic model to quantify the signal preservation. The geologic model (FIG. 6) is structurally complex without near-surface statics. FIGS. 7A, 7B and 7C are example displays of a synthetic near-offset cross-spread common source ensemble of synthetic data from the geologic model. FIG. 7A is a display of data before processing according to the techniques of the present invention shown in FIG. 5, while FIG. 7B is a display of the same data after such processing. FIG. 7C is a display of the differences between FIGS. 7A and 7B. Similarly, FIG. 8A is a display of synthetic common-source near-offset record data before processing according to the techniques of the present invention, while FIG. 8B is a display of the same data after such processing. FIG. 8C is a display of the differences between FIGS. 8A and 8B.

FIG. 9A is a display of a synthetic mid-offset cross-spread common source ensemble of synthetic data from the geologic model before processing according to the techniques of the present invention, while FIG. 9B is a display of the same data after such processing. FIG. 9C is a display of the differences between FIGS. 9A and 9B. Similarly, FIG. 10A is a display of synthetic common-source mid-offset record data before processing according to the techniques of the present invention, while FIG. 10B is a display of the same data after such processing. FIG. 10C is a display of the differences between FIGS. 10A and 10B.

FIG. 11A is a display of a synthetic far-offset cross-spread common source ensemble of synthetic data from the geologic model before processing according to the techniques of the present invention, while FIG. 11B is a display of the same data after such processing. FIG. 11C is a display of the differences between FIGS. 9A and 9B. Similarly, FIG. 12A is a display of synthetic common-source far-offset record data before processing according to the techniques of the present invention, while FIG. 12B is a display of the same data after such processing. FIG. 12C is a display of the differences between FIGS. 12A and 12B. In each of the three cases, it is to be noted that processing according to FIG. 5 of the present invention preserves the signal amplitude and phase.

Real Data Verification

By way of example, a series of surveys were conducted based on a time-distance rule based simultaneous source blended field acquisition test employing a fixed continuous recording receiver super-spread. A total of 18 vibrator sources were operating independently in 3×6 sectors (FIG. 13A), where each sector was 1.8 km×1.8 km with 4,320 VPs on a 25 m×25 m source grid interval. Data was acquired with 18 unique linear upsweeps, ranging from 6 to 23 s. To optimize the field test time, the sweep lengths were changed in each sector as shown in FIG. 13B.

Figure 13A:
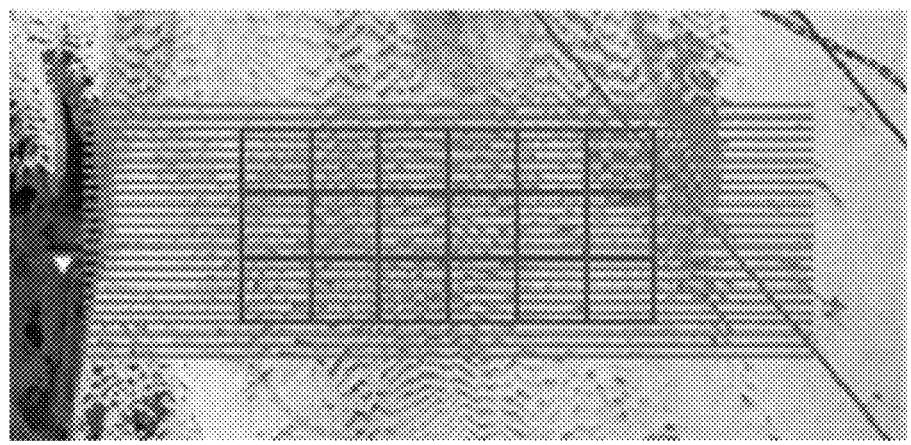
FIG. 13A is a schematic diagram of the arrangement of sectors of an area of the earth's surface for a vibroseis survey field acquisition test.
Figure 13B:
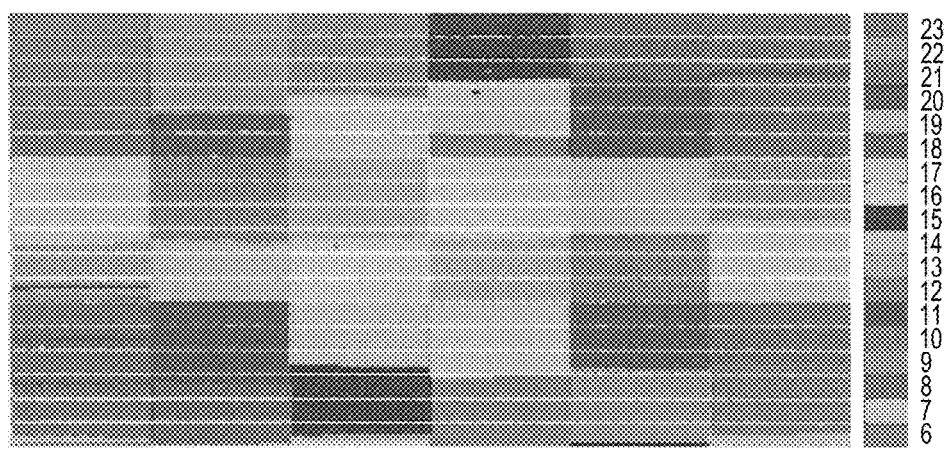
FIG. 13B is a color diagram of the allocation of frequency sweep lengths for the vibratory energy sources in the various sectors of FIG. 13A.
Figure 14:
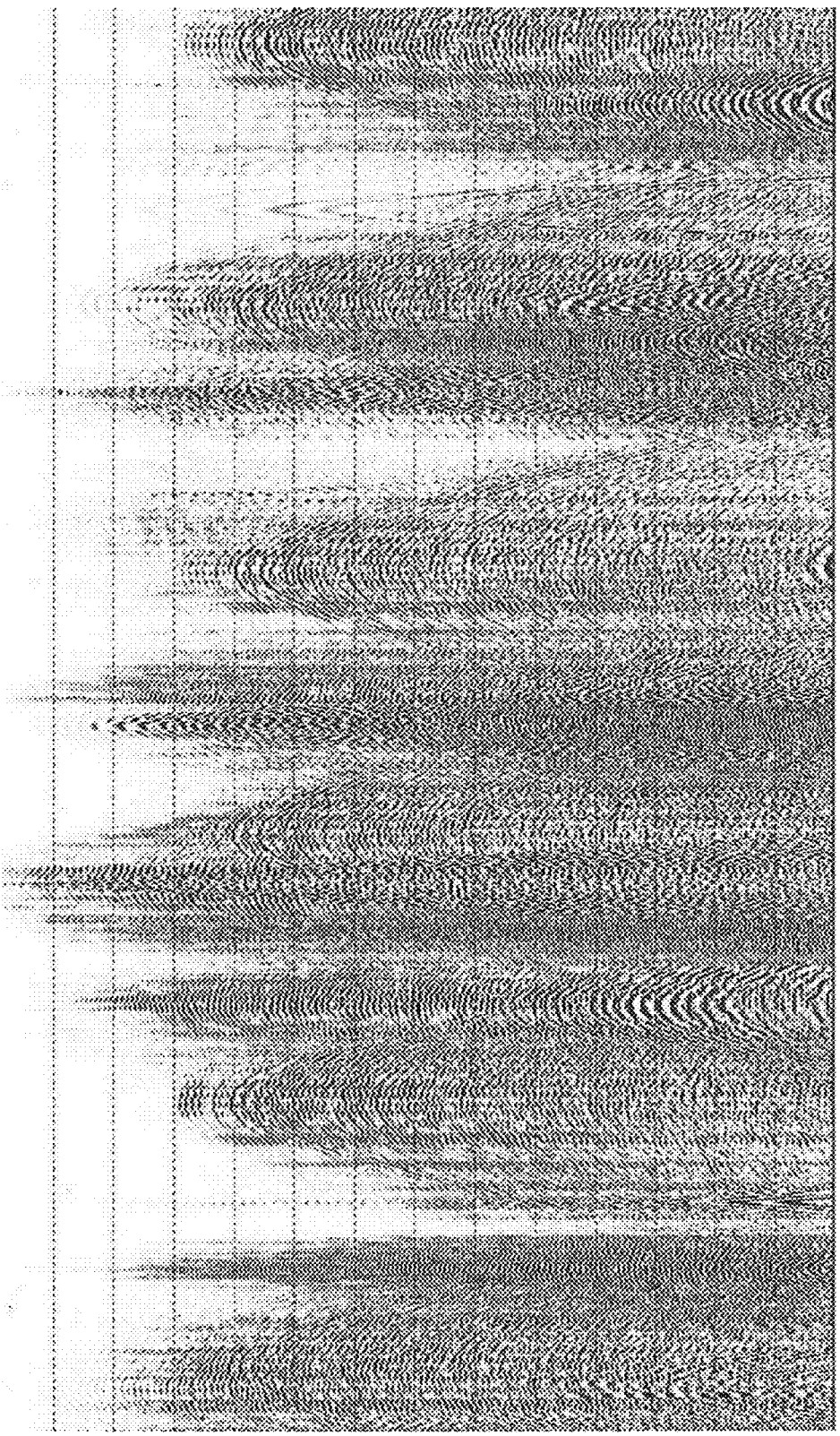
FIG. 14 is a plot of actual data from a vibroseis survey field acquisition test.

In the field data acquisition of FIG. 13A, the optimum distance-time rules were not used. Vibrators were positioned in the North-West position of each sector (FIG. 1), separated by two kilometers and operated independently of one another. Without a time rule, the randomization was dependent on the random moveup times from vibrator drivers. Final analysis of source initiation times demonstrated their random nature. Although the vibrators started with an initial separation of two kilometers, faster drivers quickly overcame slower drivers, which introduced maximum crosstalk interference as show in the data plots of FIG. 14 from these surveys. Without a minimum distance rule, it is to be noted that maximum crosstalk interference occurs when vibrators fleets operating at near simultaneous times are not separated in distance.

Figure 15:
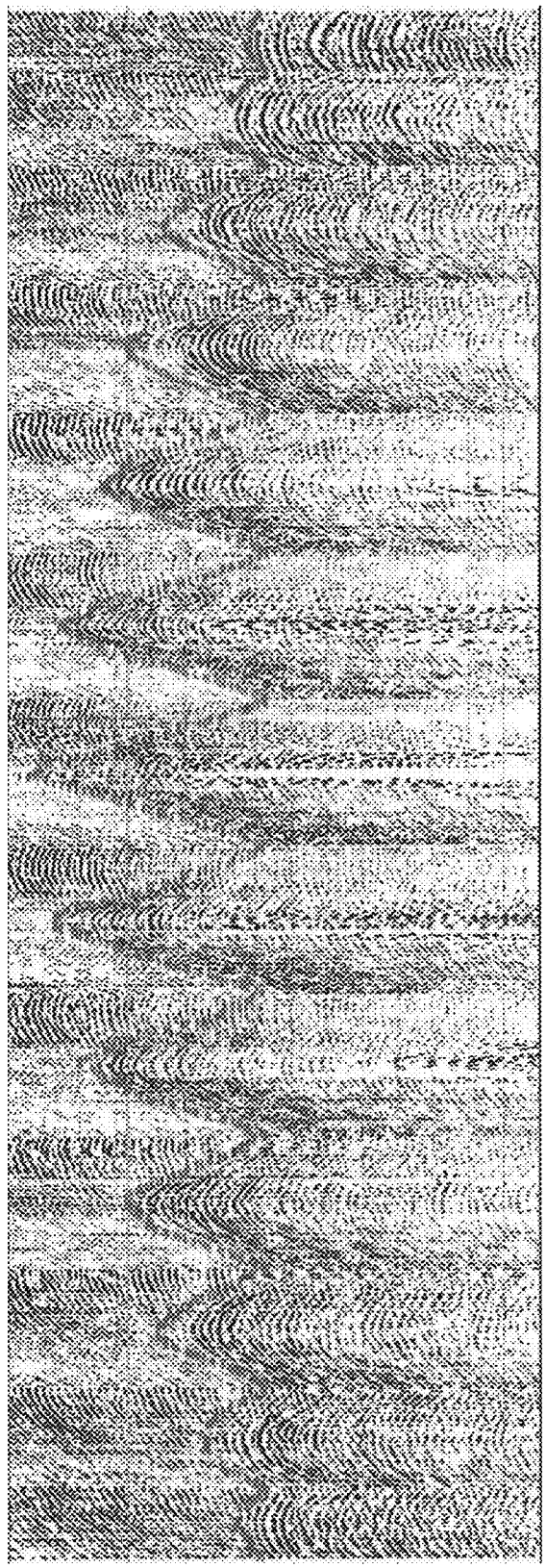
FIG. 15 is a plot of first-break auto picking results on a sample vibroseis survey data gather.

Next, automatic first break picking on blended source records was tested. FIG. 15 illustrates the advantage of using unique linear sweeps. A known first break picking algorithm can easily locate the first arrival Klauder wavelet when it is masked by uncompressed crosstalk noise, as indicated by the dots plotted in superimposition in FIG. 15 which represent the picked first-breaks on the sample gather. Thus, the uncompressed crosstalk noise has little impact on the method of picking.

Having verified that refraction statics are not impacted by this type of uncompressed crosstalk noise and would even perform better after deblending, the common-midpoint stacking velocity analysis was investigated. In the velocity analysis, common-offset traces from different azimuths are summed into an absolute offset bin.

Figure 16C:
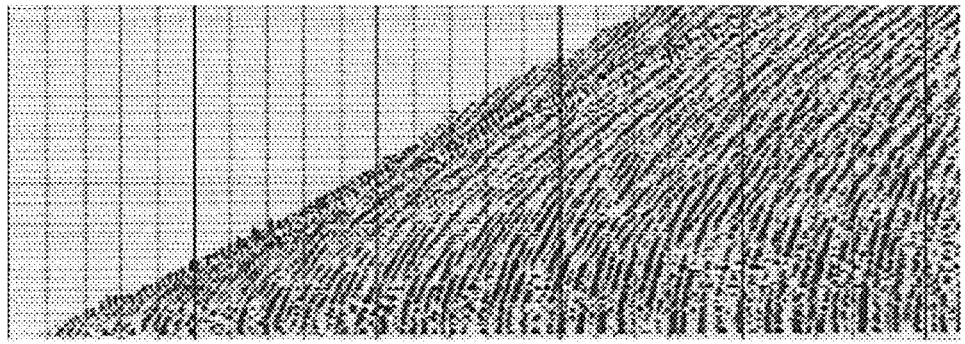
FIG. 16C is a plot of an example gather of gather of a vibroseis survey of the same sector as FIG. 16A.
Figure 16B:
FIG. 16B is a plot of velocity semblance of the production data of FIG. 16A.
Figure 16A:
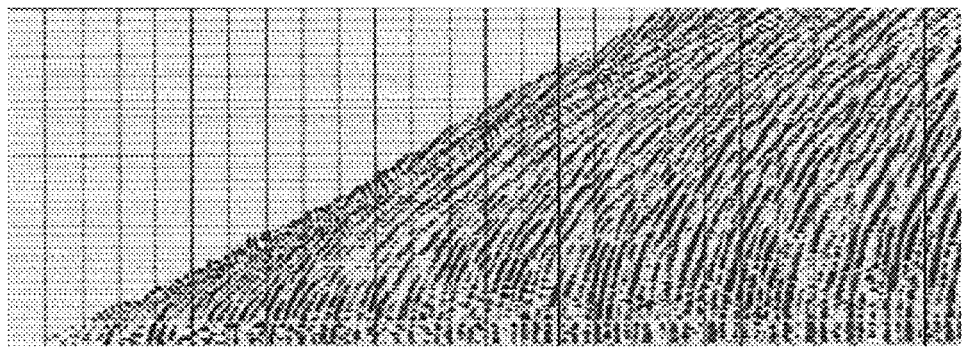
FIG. 16A is a plot of an example gather of actual reference production data.
Figure 16F:
FIG. 16F is a plot of velocity semblance of the survey data of FIG. 16E.
Figure 16E:
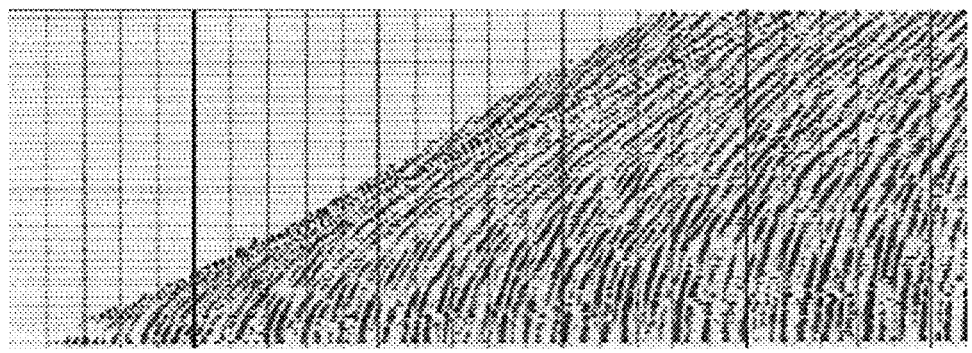
FIG. 16E is a plot of an example gather of the survey data of FIG. 16C after processing according to the present invention.
Figure 16D:
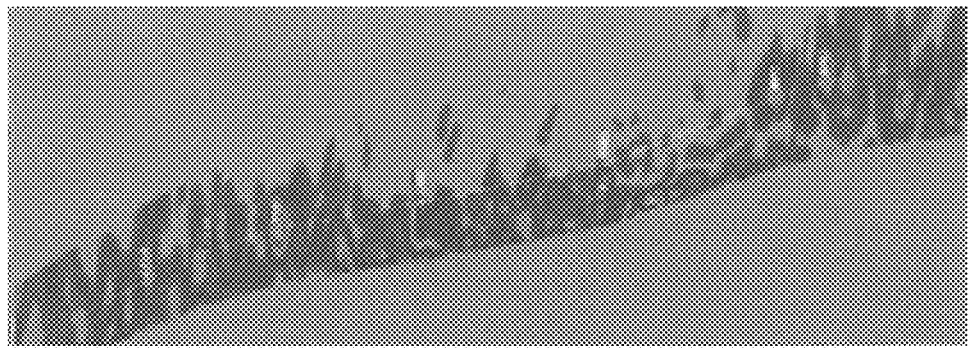
FIG. 16D is a plot of velocity semblance of survey data of FIG. 16C.

FIGS. 16A through 16F are plots of pairs of source records and velocity analysis semblance displays. FIG. 16A is a plot of the raw production source record acquired without using the simultaneous source method, and FIG. 16B is a velocity analysis semblance display based on the data of FIG. 16A. FIG. 16C is a plot of a source record after blending and FIG. 16D is a velocity analysis semblance display based on the data of FIG. 16C. FIG. 16E is a plot of deblended results from processing the data displayed in FIG. 16A, and FIG. 16F is a velocity analysis semblance display based on the data of FIG. 16E. It is to be noted that there are very little differences in the three sets of data displays. The raw production (conventional non-simultaneous source acquisition) (FIGS. 16A and 16B), blended (FIGS. 16C and 16D) and deblended (FIGS. 16E and 16F) T-X super-gathers all look the same along with their respective velocity analysis semblance plots. This confirms that in this field test the source initiation times are random based on the random moveup times of vibrator drivers. To lower the risk, random initiation times can be assigned to each survey fleet. The data verification indicates there is little impact by crosstalk noise on residual statics. The results demonstrate once again that the use of unique and distinct linear sweeps for the different sources in a survey gives us a tremendous advantage when the crosstalk noise is an uncompressed chirp signal.

Figure 17A:
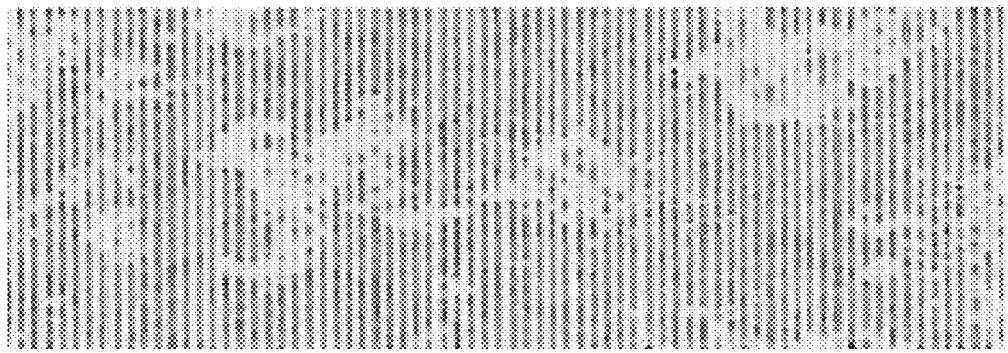
FIG. 17A is a plot of source residual statics for non-simultaneous production data.
Figure 17B:
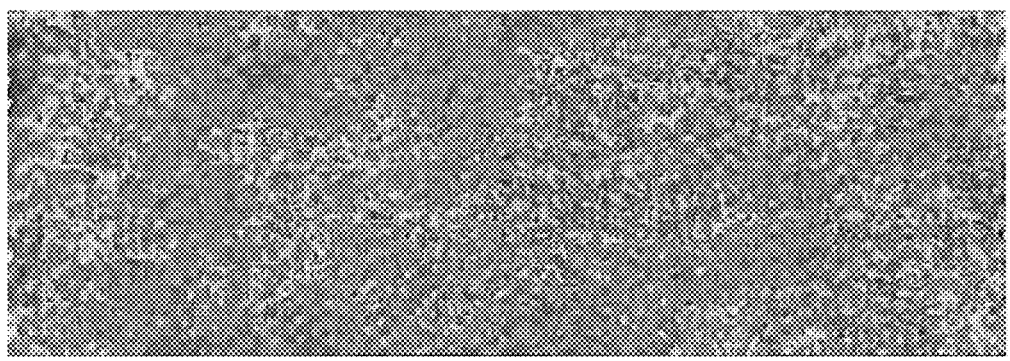
FIG. 17B is a plot of source residual statics for of a vibroseis survey of the same sector as FIG. 16A.
Figure 17C:
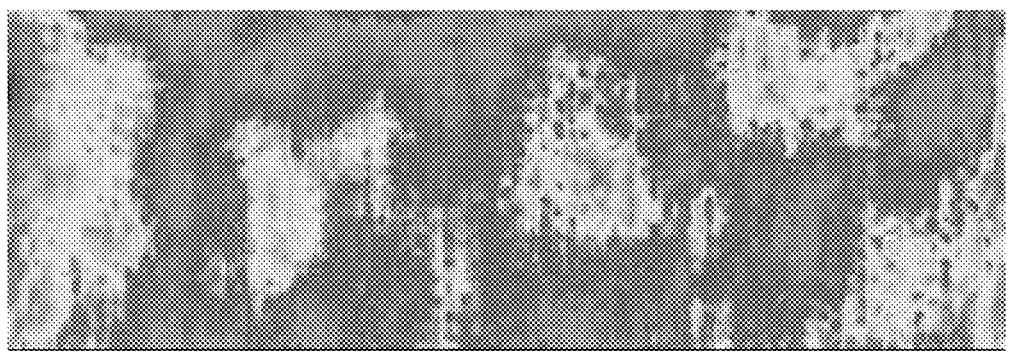
FIG. 17C is a plot of source residual statics for the data of FIG. 17B after processing according to the present invention.

FIG. 17A illustrates the source residual statics results for non-simultaneous production sparse, FIG. 17B illustrates source residual statics for simultaneous blended acquisition, and FIG. 17C illustrates source residual statics for simultaneous deblended acquisition. Even without deblending, the residual source statics values illustrated in FIGS. 17A, 17B and 17C are in agreement with the production results and improved with deblending. These results confirm the power of using unique linear sweeps.

Figure 18A:
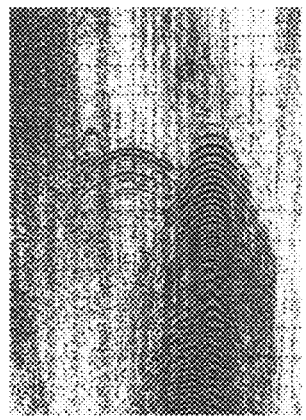
FIGS. 18A, 19A and 20A are plots of common source gathers from vibroseis survey data.
Figure 18B:
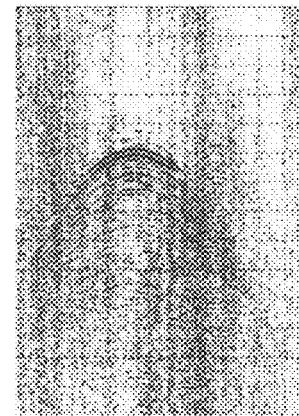
FIGS. 18B, 19B and 20B are plots of common source gathers of the data of FIGS. 18A, 19A, and 20A, respectively, after processing according to the present invention.
Figure 19A:
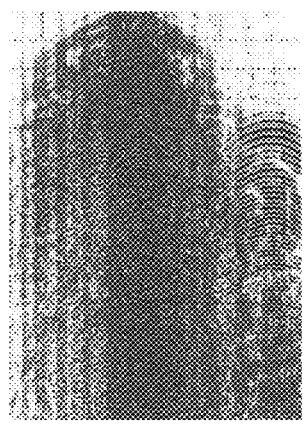
Figure 19B:
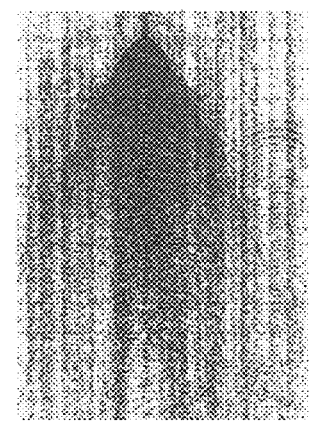
Figure 20A:
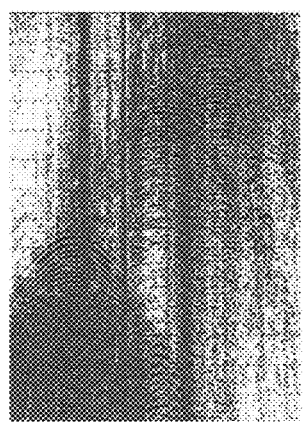
Figure 20B:
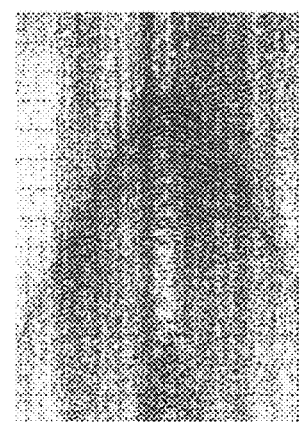

Although the field test was designed as an independent simultaneous source design with maximum crosstalk interference, it proved to be an ideal real data example to test deblending processing according to the present invention. FIGS. 18A, 19A and 20A illustrate how well the present invention attenuates crosstalk signal and surface wave interference in comparison with their corresponding unblended source gathers of Figures of FIGS. 18B, 19B and 20B, respectively.

Figure 21A:
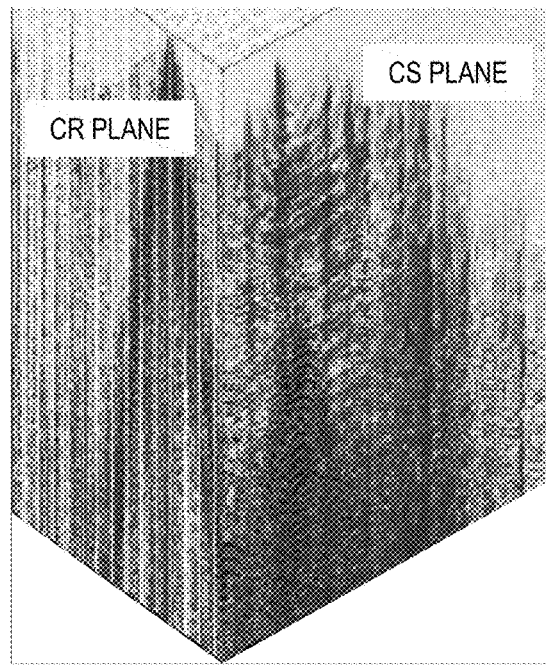
FIG. 21A is a plot of a sample cross-spread gather displayed in a 3D mode for common reference plane and common receiver plane.
Figure 21B:
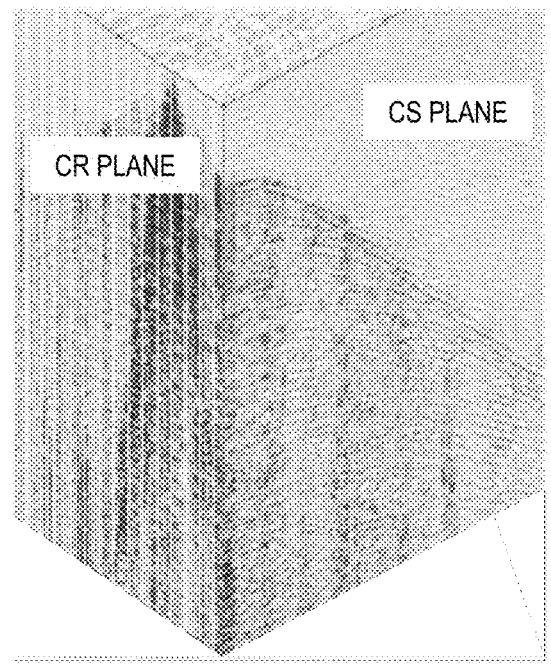
FIG. 21B is a plot of the data in the sample cross-spread gather of FIG. 21A after processing according to the present invention.

FIG. 21A illustrates a plot of a single cross-spread volume sliced along the common-receiver and common-source planes after deblending, while FIG. 21B is a corresponding plot of the same cross-spread volume without application of deblending. The image in FIG. 21A further verifies the ability of the present invention to attenuate crosstalk noise. It is to be noted how well deblending attenuates crosstalk noise in the common-receiver (CR) and common-source (CS) domain.

Figure 22A:
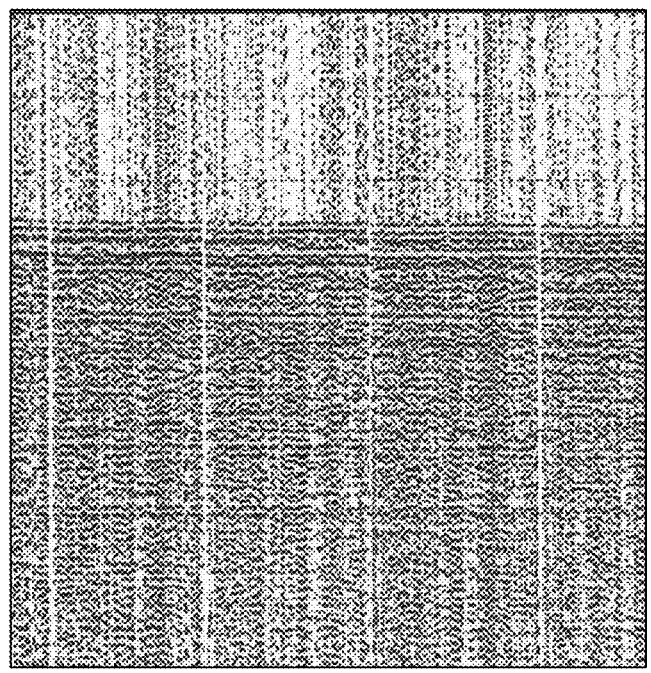
FIGS. 22A and 22B are plots of a pre-stack common-offset ensemble for near-offset survey data before and after, respectively, processing according to the present invention.
Figure 22B:
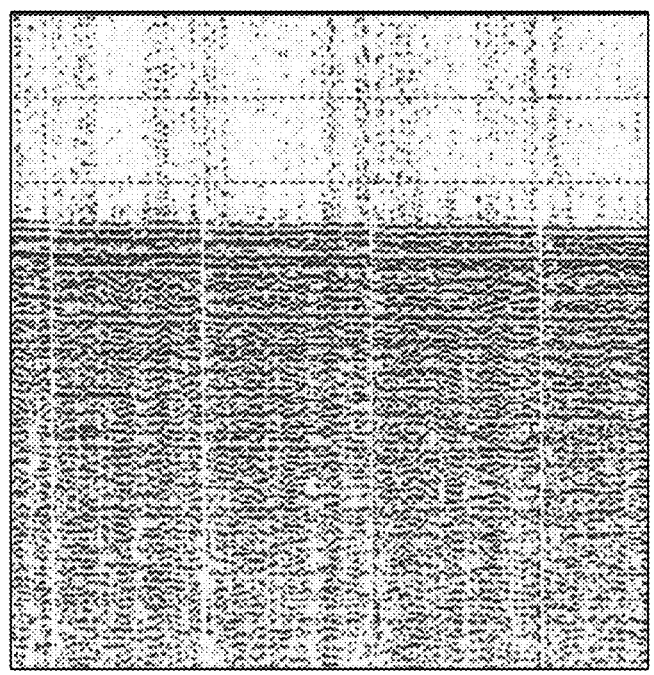
Figure 24A:
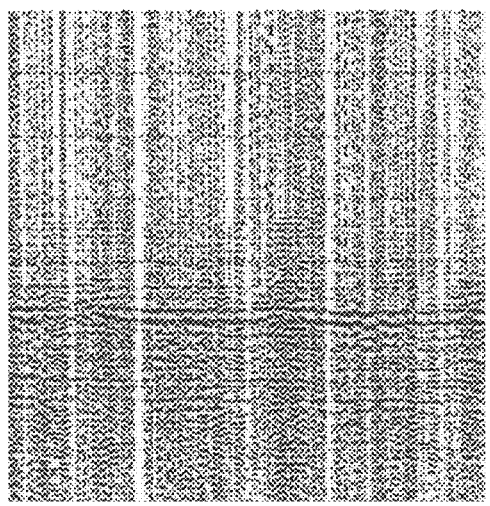
FIGS. 24A and 24B are plots of a pre-stack common-offset ensemble for mid-offset survey data before and after, respectively, processing according to the present invention.
Figure 24B:
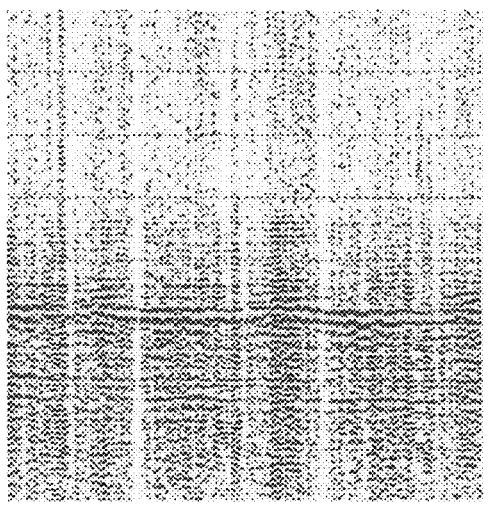

The power of the new coupled acquisition and deblending processing according to the present invention if further illustrated by evaluating the pre-stack common-offset ensembles. FIG. 22A is a plot of a pre-stack common-offset ensemble for near offset data before deblending according to the present invention, while FIG. 22B is a plot of the same data after deblending. FIG. 24A is a plot of a pre-stack common-offset ensemble for mid-offset data before deblending according to the present invention, and FIG. 24B is a plot of the same data after deblending. FIG. 26A is a plot of a pre-stack common-offset ensemble for far-offset data before deblending according to the present invention, and FIG. 24B is a plot of the same data after deblending.

Figure 23A:
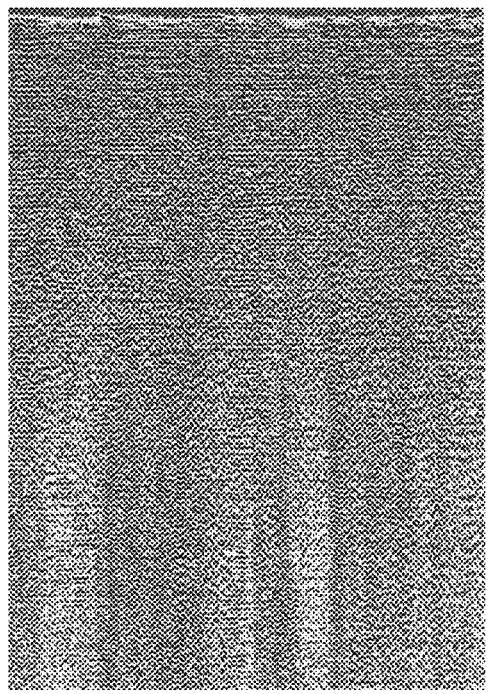
FIGS. 23A and 23B are plots of a common-midpoint stack for near-offset survey data before and after, respectively, processing according to the present invention.
Figure 23B:
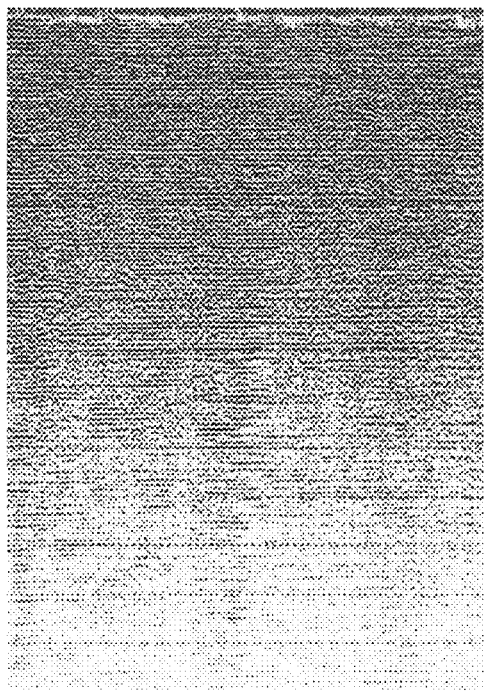
Figures 27A, 27B:
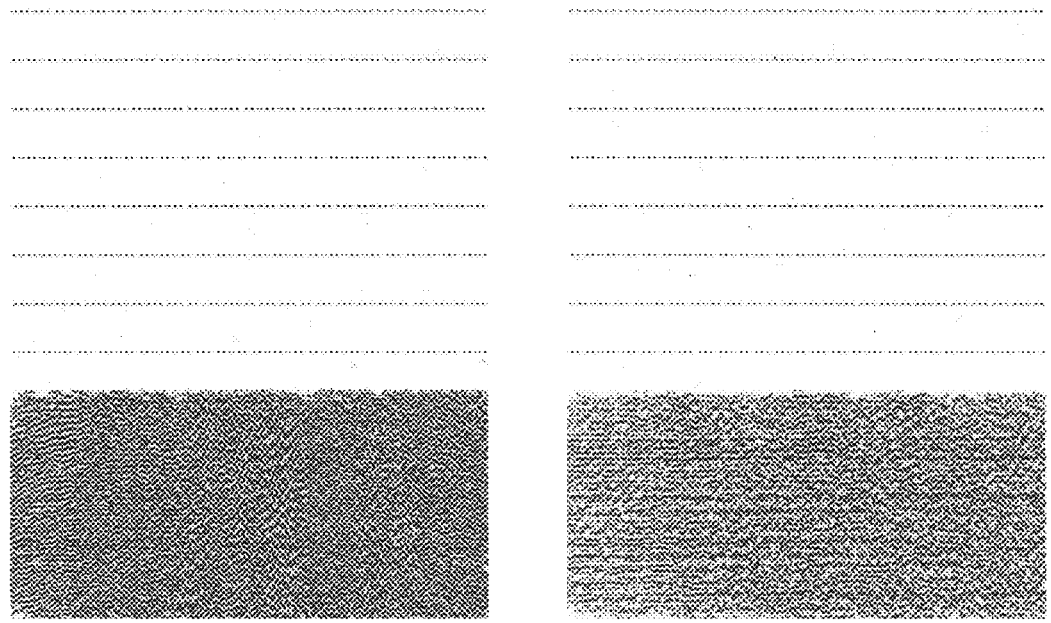
FIGS. 27A and 27B are plots of a common-midpoint stack for far-offset survey data before and after, respectively, processing according to the present invention.

FIG. 23A is a plot of a common-midpoint stack for near-offsets before deblending according to the present invention, and FIG. 23B is a plot of the same data after deblending. FIG. 25A is common-midpoint stacks for id-offsets before deblending according to the present invention, and FIG. 25B is a plot of the same data after deblending. FIG. 27A is common-midpoint stacks for far-offsets before deblending according to the present invention, and FIG. 27B is a plot of the same data after deblending. It can be observed that the magnitude of crosstalk interference increases with time and offset, as expected from the initial minimum distance rule. In the case of each of near-, mid- and far-offset stacks, the deblending of common-offset cross-spread or common-receiver gathers according to the present invention has successfully attenuated the crosstalk noise.

Figure 28:
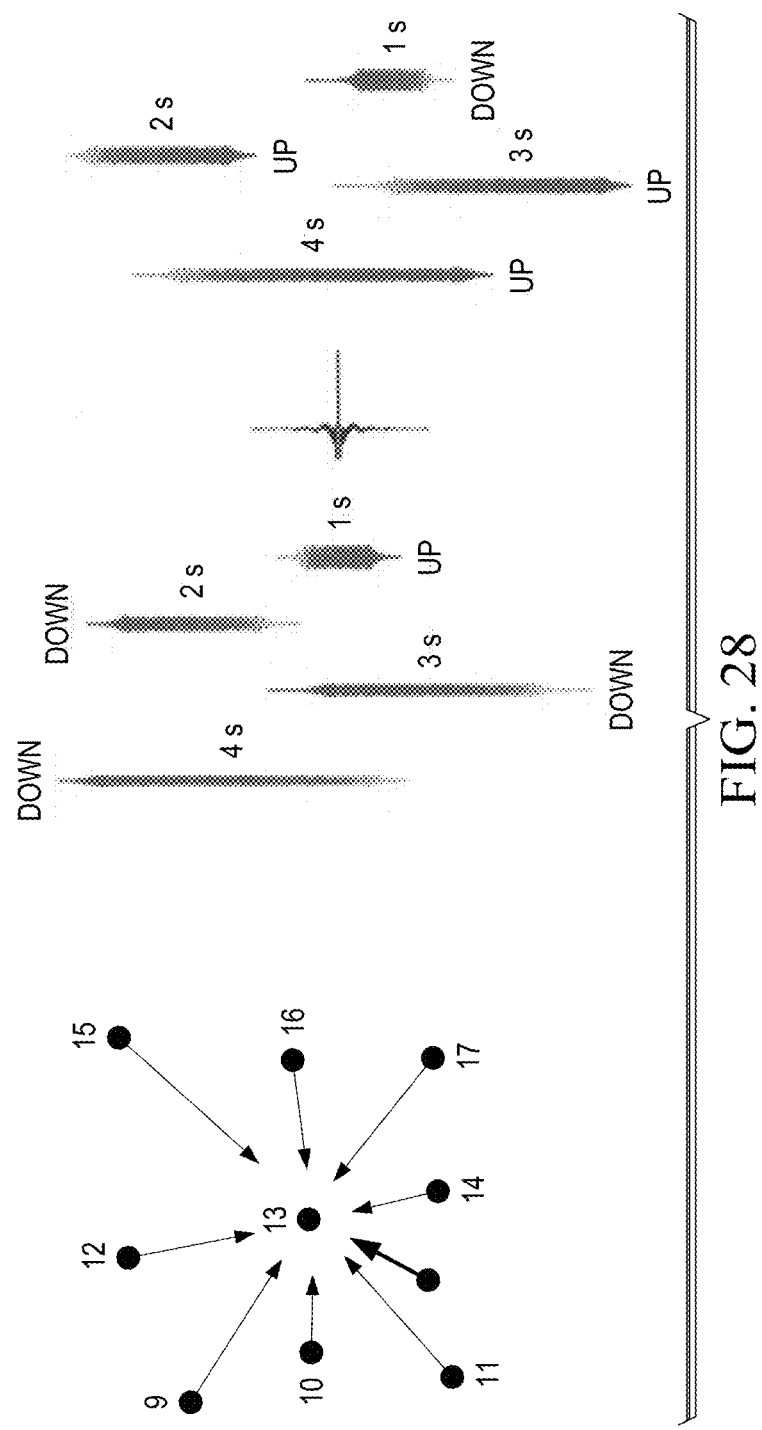
FIG. 28 is a schematic diagram of a common receiver trace configuration and associated plots of crosstalk noise from swept frequency emissions at a point source.

As a further survey, a single receiver station from the center of the first sectored field test design surrounded by 8 near-simultaneous vibroseis sources with different sweep lengths. After correlation, the seismic trace includes a single correlated signal and eight variable length uncompressed up and down-going uncompressed guided mode signals arriving at variable times (FIG. 28). FIG. 28 illustrates a group of point sources shown as outer dots surrounding a centrally located receiver. The point sources have different sweep lengths as indicated at the right which introduce uncompressed crosstalk noise at variable times. The crosstalk arrival times depend on variable source cycles times (variable sweep lengths, terrain conditions and vibrator driver experience). Assuming that the source cycle time variables are the same except for the sweep length differences, the start times were found to rarely have overlapped in time. In fact, most occur while the other vibrator fleets are moving from one VP to the next. It is not only that the vibrator start times occur during different moveup times, a different set of fleets with unique sweep lengths sweep during different moveup times adding to the diversity of uncompressed crosstalk noise in the 3D common receiver domain.

According to the present invention, survey parameters for a wide receiver spread with vibroseis fleets positioned outside the spread are first that the source swath outside the wide receiver spread is divided into sectors equal to the number of active fleets. A minimum sweep length is chosen and incremented by twice the primary two-way target time for each different source. A unique sweep length is assigned to each sector with the same bandwidth to each production fleet. The number of vibration points within each sector is designed such that all fleets complete their swaths at approximately the same time. Radio communication and source controllers can be used for the purpose of optimizing productivity in complex areas and pseudo real-time quality control. Each sector should be surrounded by adjacent sectors with increasing and decreasing sweep lengths to achieve optimum denoising. This ensures a sparse combination of up and down-going uncompressed crosstalk guided mode signals. Each unique correlation is normalized by the sweep length. This is to be sure that the correlated records each have the same signal power.

Figure 29:
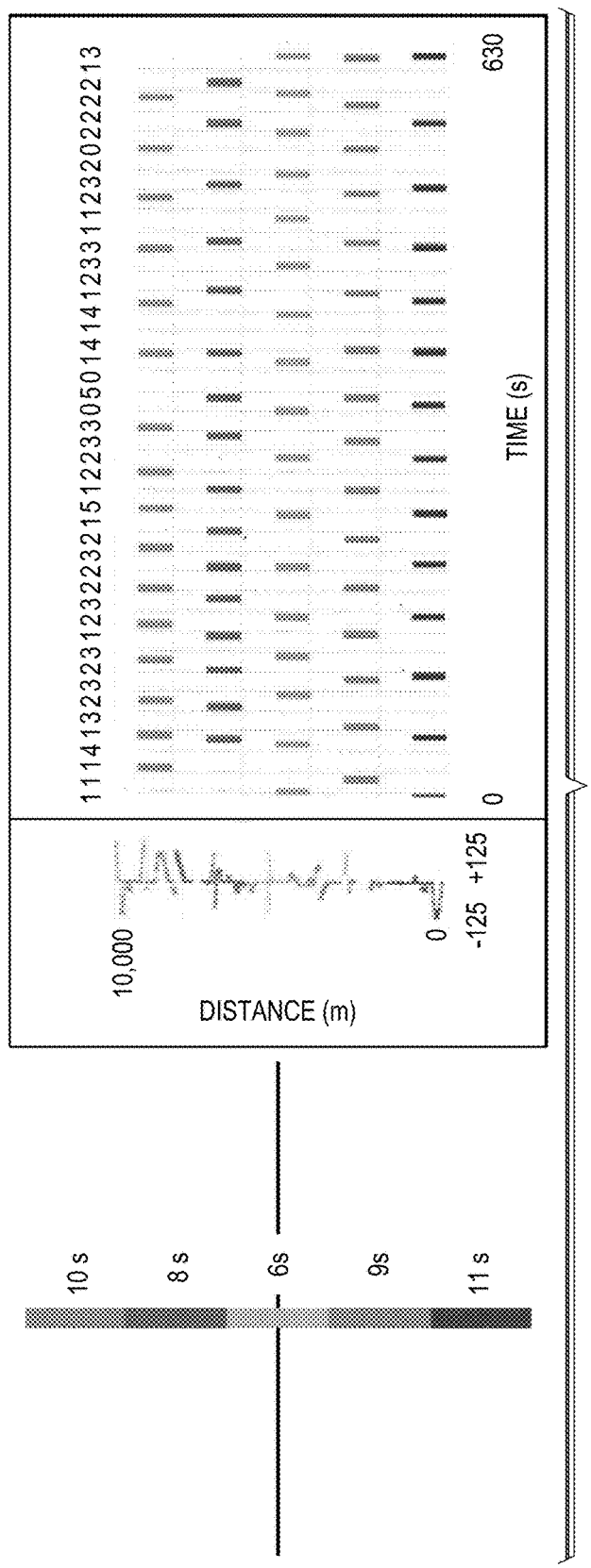
FIG. 29 is a schematic diagram of cross-spread field test source geometry and sweep start times.
Figure 30C:
FIGS. 30A, 30B and 30C are plots of cross-spread common source gathers from swept frequency source emissions.
Figure 30B:
Figure 30A:

To test these design principles a second cross spread field test was developed and data acquired in a (three passes) in flip-flop mode with the same sweep, 5 fleets (two vibrators per fleet) operating in near-simultaneous model with unique sweeps and the same sweep. The 10 km source line was divided into five sectors with unique sweep lengths. The source and receiver group intervals were 12.5 m (FIG. 29). FIG. 29 illustrates a cross spread concurrent near-simultaneous field test source geometry for five independent vibroseis fleets numbered 1 through 5 at the left and their associated sweep start times. It is to be noted that very few of the five independent vibroseis fleets had which overlap in time. Surprisingly and unexpectedly, this design was too conservative and virtually all common source and receiver planes were free of crosstalk interference (FIGS. 30A, 30B and 30C). FIGS. 30A, 30B and 30C are plots of cross spread common source absolute offset gathers (common offset summation). FIG. 30A is a plot of a gather obtained with conventional flip-flop acquisition, while FIG. 30B is a plot of near-simultaneous unique sweeps according to the present invention and FIG. 30C is a gather from the same sweep. The absence of crosstalk interference on near-simultaneous gathers in FIG. 30B as compared to the gather of FIG. 30A is to be noted. Further analysis revealed that detours increased the variable source cycles such that near-simultaneous start times rarely overlapped in time. This result confirmed that virtually all sweep start times occurred while the other fleets were moving from one VP to the next.

Figure 31:
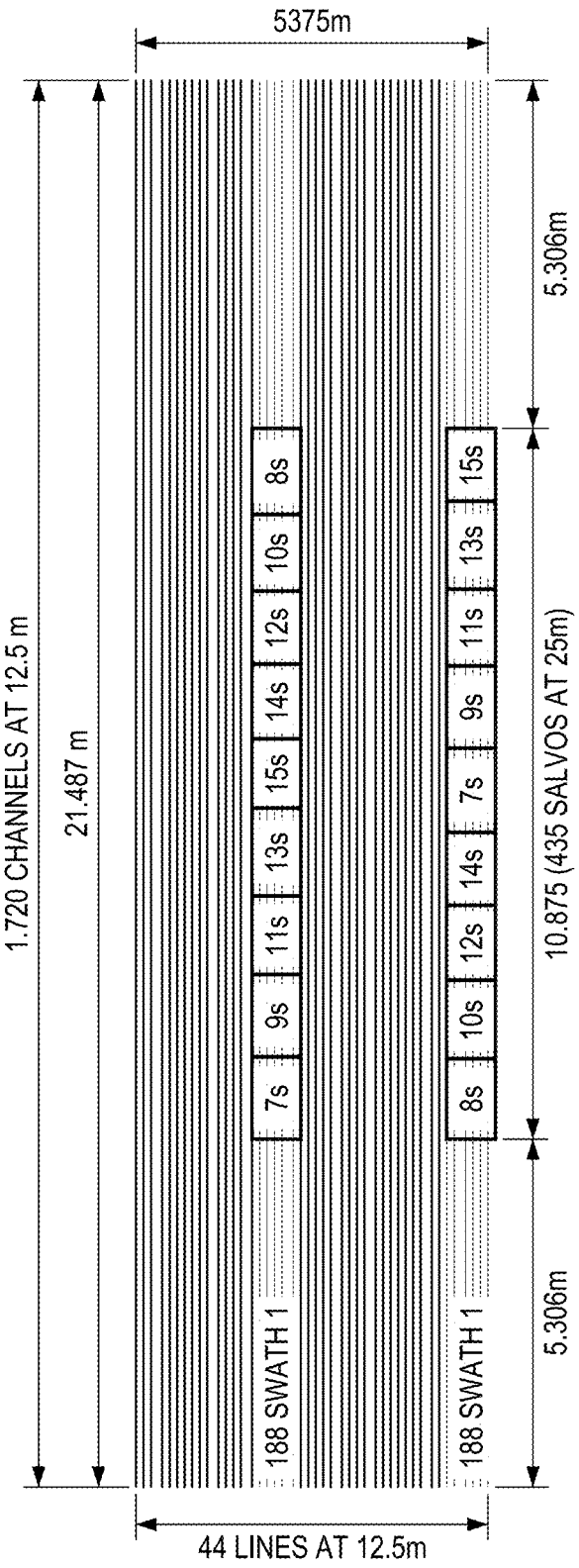
FIG. 31 is a schematic diagram of field design of a swept frequency survey according to the present invention over a development field of interest.
Figure 32:
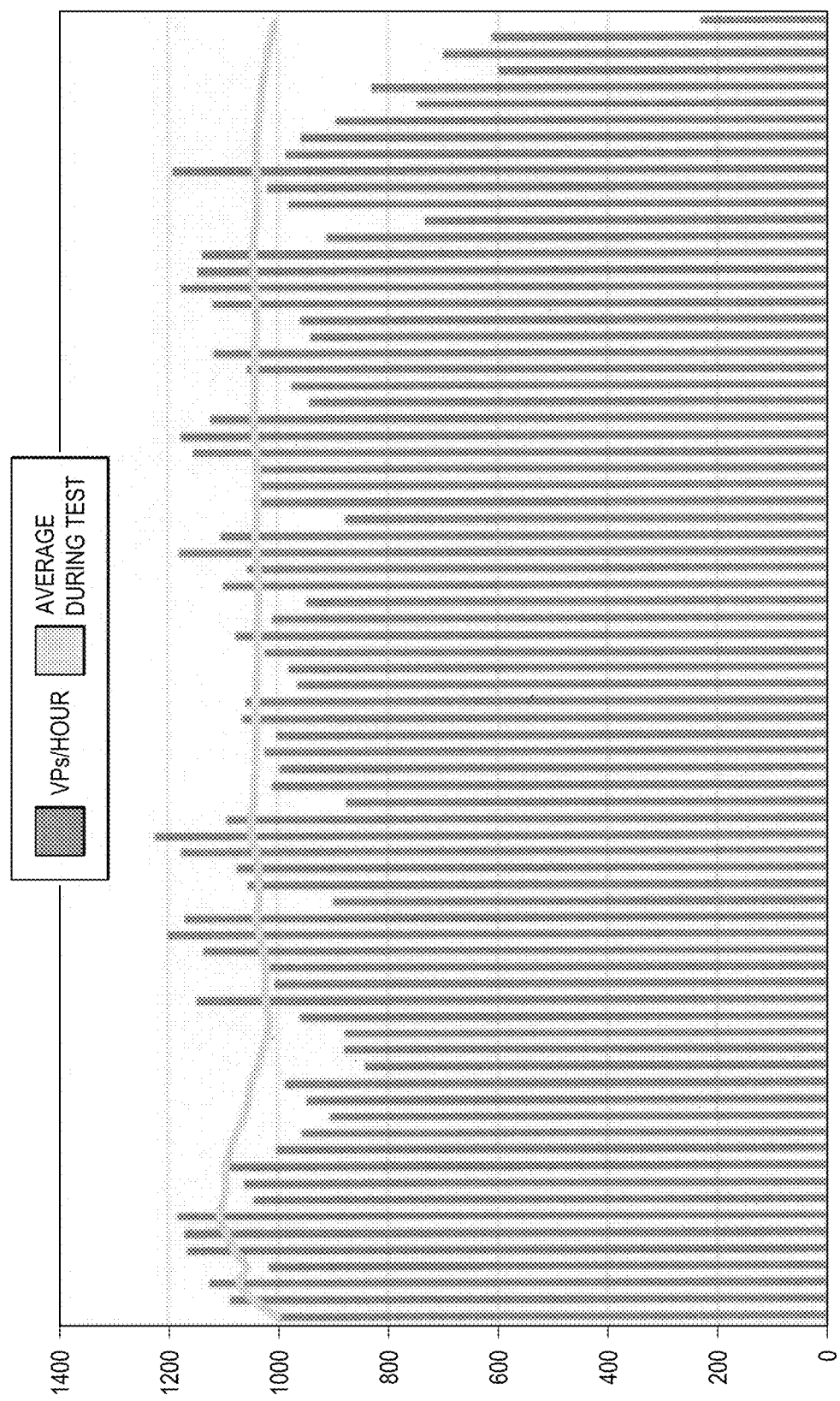
FIG. 32 is a plot of the number vibration points during a survey as a function of time during a swept frequency survey according to the present invention.

A production field test design was acquired over a development field with 18 point vibrators and 6 spares positioned outside a kilometer wide operational spread with 24 active receiver lines within a fixed 48 receiver line operational spread. Nine fleets were assigned to nine sectors to the North and South with unique sweeps between adjacent sectors. The source line and group interval were 25 m, receiver line interval was 125 m and receiver group interval was 12.5 m (FIG. 31). To simulate a production spread, the fleets could not acquire the next super swath until all fleets had acquired their assigned VPs in a sector. This design achieved over 1,000 VPs/hour (FIG. 32) over a development field with a dense distribution of pipelines, facilities and variable terrain. In open desert areas, we can anticipate rates greater than 40,000 VPs per 24 hours.

The acquisition design methodology described above provides control of a sparse distribution of uncompressed crosstalk signals in 3D common receiver gathers. Sparse within a localized time-offset window means that most of the traces are signal only and the uncompressed up and down-going cross-talk noise is narrow band. These two properties allow estimation of an unbiased signal power spectrum and apply a simple time-frequency threshold filter over this narrow band of frequency, leaving the rest untouched. If needed, residual crosstalk noise can be further attenuated in narrow frequency bands after surface consistent processing with a time or frequency domain wavelength dependent median filtering. What separates this acquisition design from previous efforts is the ability to control the crosstalk time-frequency properties for optimum crosstalk attenuation and signal preservation.

Figures 33A, 33B:
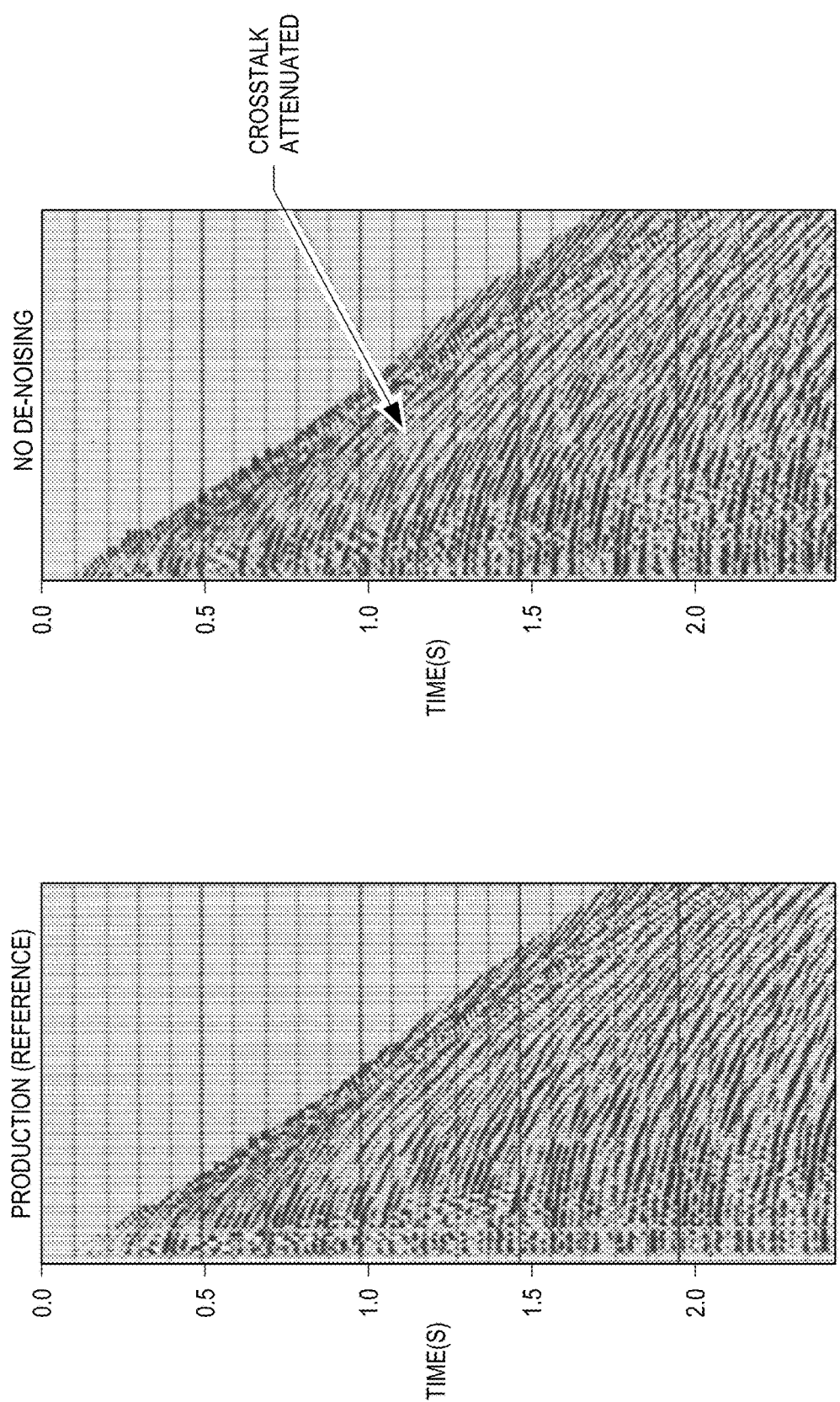
FIGS. 33A and 33B are plots of velocity analysis of survey gathers.
Figure 34A:
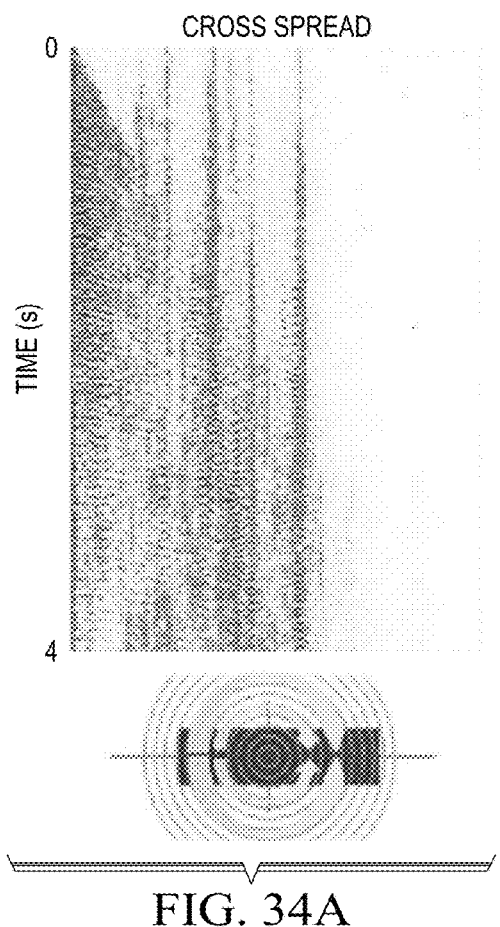
FIG. 34A is a plot of a survey gather for an absolute offset stacked cross spread.
Figure 34B:
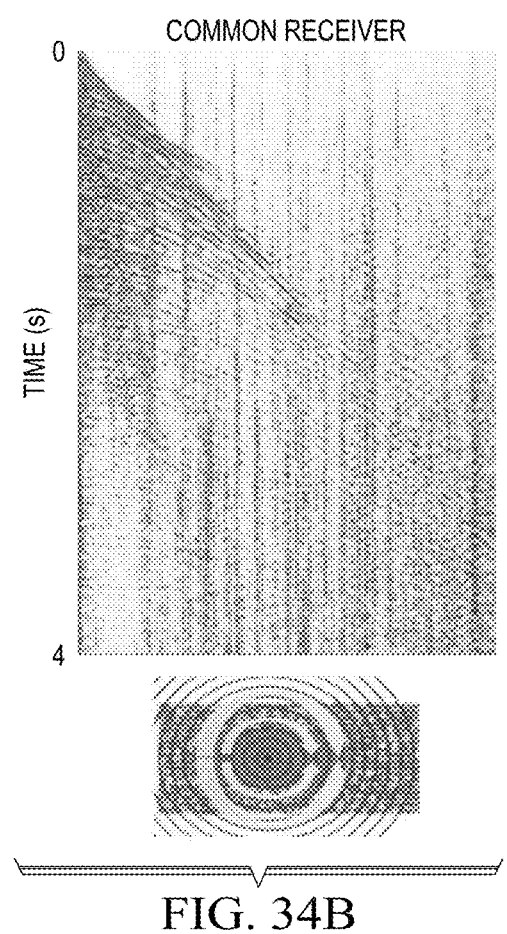
FIG. 34B is a plot of a survey gather for a common receiver gather.

So far as is known, in previous seismic acquisition high-productivity methods (both marine and land), the emphasis has been on controlling a pseudo-random distribution of start times and using conventional incoherent noise filters to attenuate crosstalk interference. In principle, if the start times were random, stacking (passive deblending) would attenuate the crosstalk noise by the square root of the number of summed traces. With the present invention, to investigate crosstalk noise phase diversity a common midpoint super gather was studied, including cross spread and 3D common receiver gather from the field test described above. Stacking multiple common midpoint bins resulted in a signal-to-noise improvement necessary for velocity analysis (FIGS. 33A and 33B). FIG. 33A is a gather from conventional flip-flop field testing while FIG. 33B is a gather from near-simultaneous field testing according to the present invention without de-noising. But when stacking all the cross-spread and common receiver common offset traces into an absolute offset bin, the residual crosstalk noise suggests the accepted square root law is not effective enough in these domains (FIGS. 34A and 34B).

It was concluded that relying solely on the random nature of interference alone is insufficient. An analysis of the nature of these unique crosstalk noise characteristics having variable length up and down-going uncompressed signals in the 3D common receiver domain was performed.

Figure 35B:
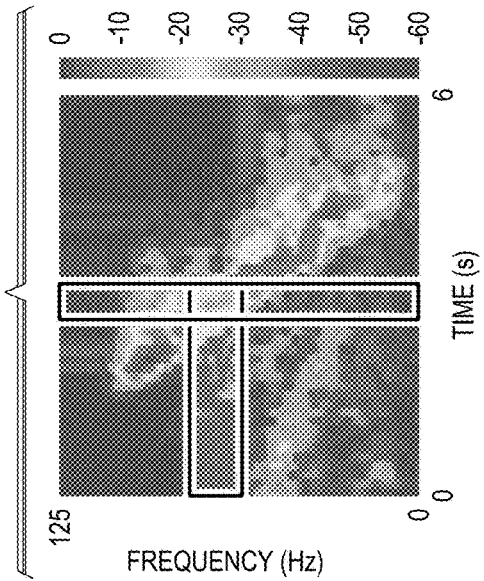
FIGS. 35B and 35C are plots of crosstalk signals for the enlarged traces of FIG. 35A after application of a localized filter window.
Figure 35C:
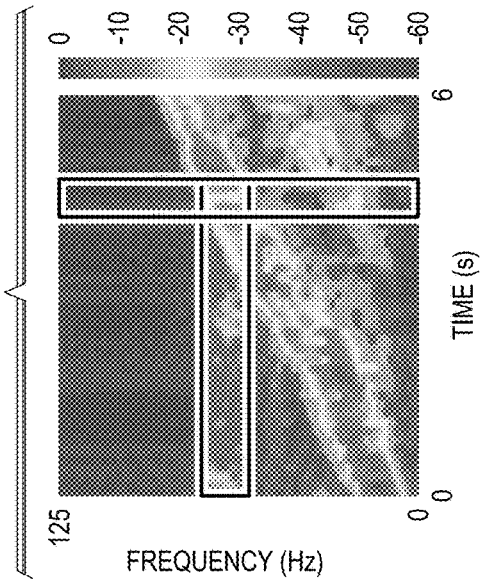
Figure 35A:
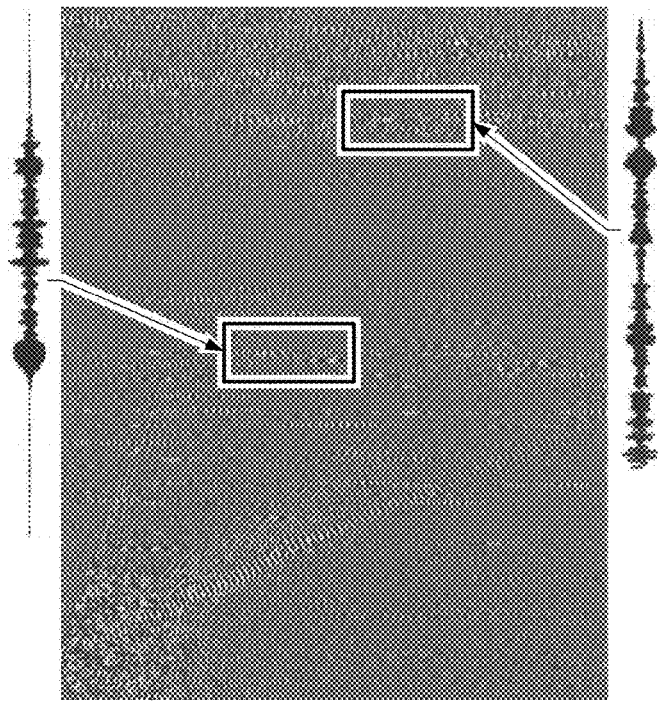
FIG. 35A is a plot of a common receiver gather and enlarged views of two crosstalk noise traces in that plot.
Figure 36A:
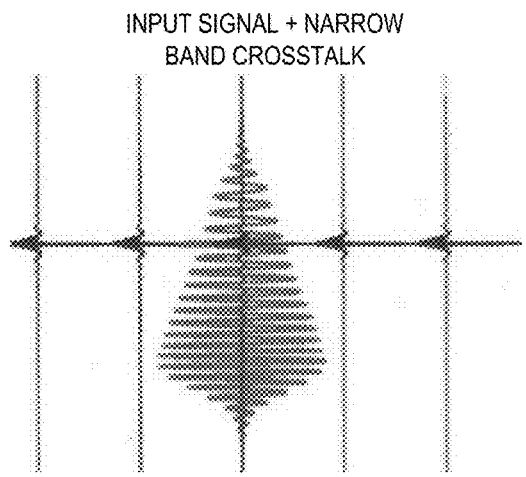
FIG. 36A is a plot of a time-offset signal with narrow band uncompressed crosstalk.
Figure 36B:
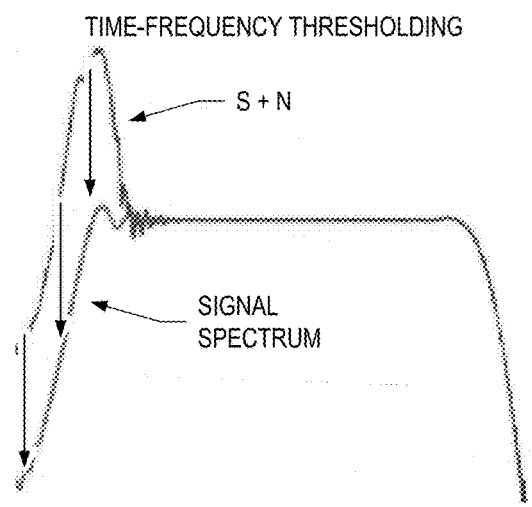
FIG. 36B is a plot of the frequency spectrum of the signal and crosstalk shown in FIG. 36A.
Figure 36C:
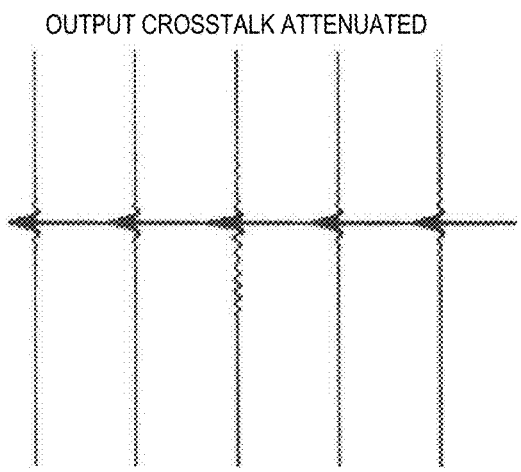
FIG. 36C is a plot of the tome offset signal of FIG. 36A after time-frequency thresholding.

In the initial field test design, different sweep lengths were assigned to each vibroseis fleet to minimize the amplitude of crosstalk interference. With only one second difference in sweep lengths, after correlation, the crosstalk noise was found to be attenuated by 20 dB. On land, guided wave modes are on average 40 dB greater than the signal. Therefore, only the guided mode crosstalk noise is 20 dB above the correlated signals. FIG. 35A illustrates in the frequency-time domain both an up-going and down-going crosstalk signal from a common-receiver gather. FIG. 35A is a plot of a common receiver gather and enlarged depictions of two extracted uncompressed crosstalk noise traces. FIGS. 35B and 35C are corresponding frequency-time displays of the two uncompressed crosstalk noise traces of FIG. 35A. When a localized filter is applied, the uncompressed crosstalk signals in both the down-going trace above the plot in FIG. 35A and the up-going trace below that plot appear as narrowband noise bursts. In this domain, it was noted that within localized time-offset windows (FIGS. 35B and 35C), the crosstalk noise is sparse and narrow band. When this sparse condition is met, an unbiased estimate of the signal spectrum can be applied in a conventional time-frequency thresholding method to attenuate the crosstalk noise (FIGS. 36, 36B and 36C). FIG. 36A is a plot of a time-offset signal plus narrow band uncompressed crosstalk, while FIG. 36B is a plot of the signal and the signal plus crosstalk amplitude spectrum. FIG. 36C is a plot of the time-offset signal after time-frequency thresholding according to the present invention.

Figure 39A:
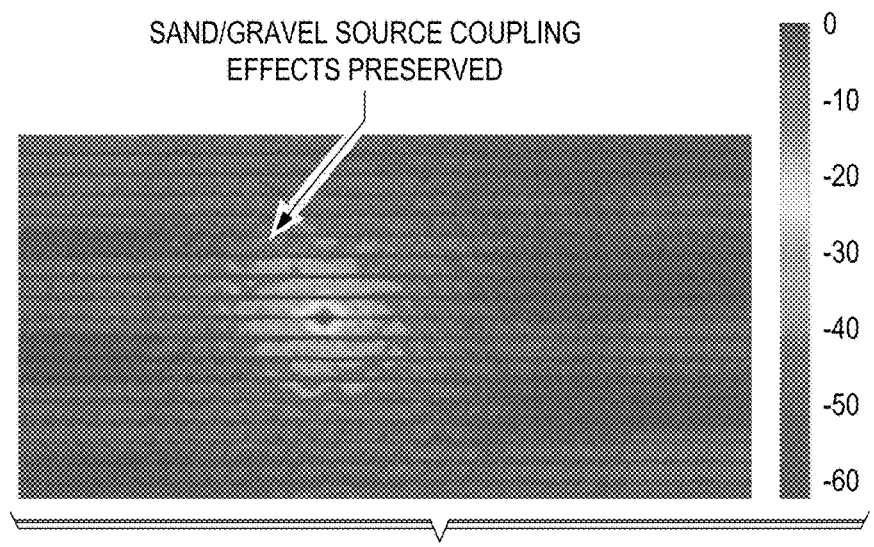
FIGS. 39A and 39B are plots common receiver RMS quality control data displays before and after offset dependent frequency thresholding, respectively.
Figure 39B:
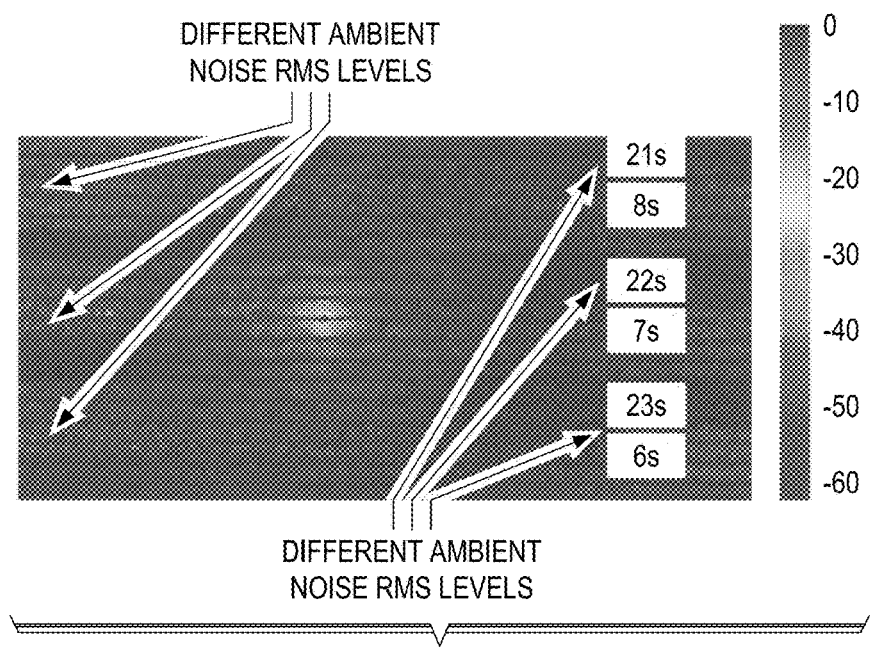

To further protect signal amplitudes with the present invention, two new offset dependent thresholding strategies are provided using a simple linear trend and a combination of median and lower quartile threshold values (FIGS. 37A and 37B, respectively). FIG. 37A illustrates a linear offset dependent frequency strategy where the frequency threshold decreases linearly as a function of offset. FIG. 37B illustrates schematically a segmented offset dependent frequency strategy. The results using the second approach (FIGS. 38A, 38B and 38C) confirmed the pre-stack signal amplitudes are effectively preserved and the crosstalk noise is attenuated to levels consistent with conventional flip-flop operations. FIG. 38A is a plot of an absolute offset stacked common receiver gather before offset dependent frequency thresholding, while FIG. 38B is a plot of the same offset stacked common receiver gather after offset dependent frequency thresholding. FIG. 38C is a plot of the differences between the data display of FIGS. 38A and 38B. Root mean square energy displays (FIGS. 39A and 39B) further confirmed relative signal preservation before and after the application of this offset-dependent thresholding filter in the 3D common receiver domain. FIG. 39 A is a plot of common receiver root mean square quality control before application of offset dependent frequency thresholding, while FIG. 39B is a plot of the same data after application of offset dependent frequency thresholding. The sinusoidal patterns show the relative changes from sand dunes to gravel plain conditions.

If additional crosstalk attenuation is needed, a simple time domain median filter can be applied to narrow frequency bands in common receiver common offset planes along constant time intervals. Consider the synthetic example shown in FIGS. 40A, 40B and 40C. FIG. 40A is a synthetic example of sparse uncompressed crosstalk noise in a signal. FIG. 40B illustrates how crosstalk within the data of FIG. 40A appears as spikes in subbands, which in FIG. 40C are attenuated with application of a 3-point median filter. The signal includes a combination of up and down-going uncompressed crosstalk noise arriving at different times. When this ensemble is transformed into a narrow band (0 to 7 15 Hz), the uncompressed crosstalk noise now appears as narrow band spikes and a simple 3-point median filter can be used to replace these amplitudes with those from adjacent traces. To ensure signal preservation at the acquisition design stage, it is recommended to use a source grid interval which is less than the one-half the migrated Fresnel zone. On land, using these design principles and cascaded denoising workflow, near-simultaneous crosstalk noise can be effectively attenuated for pre-stack analysis. The increase in trace density and fold leads to even higher resolution pre-stack migrated images.

With the present invention, it is preferred to maximize the source density of source grids and a subsequent cascaded denoising processing in the 3D common receiver domain for full-azimuth processing. The present invention includes recording 12.5 m uniform source grids (6,400 VPs/km2) with low-dwell broadband frequency sweeps. This source sampling grid offers the opportunity to record and attenuate unaliased noise wavefields, extend the signal bandwidth and improve the resolution of acoustic impedance volumes. The present provides the ability to extract geobodies at sub-seismic resolution and assign reservoir attributes for simulation models.

The present invention accordingly provides both a time and cost efficient method to acquire high-density source and receiver acquisition designs which will lead to higher resolutions seismic images. The time-distance rule based acquisition design according to the present invention allows achievement of high-density source acquisition designs in an equivalent amount or less time and controls the level of crosstalk interference on source records.

Unique linear sweep designs assigned to fleets reduces the magnitude of uncompressed crosstalk interference. The uncompressed chirp signals (crosstalk) do not significantly bias first break picking and surface consistent processing methods. High trace density cross-spread or common-receiver gathers satisfy the mathematical requirements for optimum deblending. If statics or structural dips exist within a common-offset cross-spread or common-receiver ensemble, inter-ensemble statics or structural time delays are applied to flatten the signal event.

High-amplitude spectral attenuation in the frequency-space domain is used with the present invention to precondition the source records for time-offset domain 3-point median filtering. The 3-point median filter attenuates the crosstalk noise and preserves the signal. The present invention attenuates crosstalk noise while preserving the signals for high source and receiver density acquisition designs. The crosstalk noise is attenuated with two a priori preconditioning steps. First, high-amplitude spectral amplitudes are attenuated, and then inter-ensemble statics or structural time delays are applied to achieve optimum 3-point median filter performance.

A single time-distance rule-based acquisition design has thus been provided to acquire an independent simultaneous source field test data set. This data set meets the a priori requirements for the deblending processing invention. The whole deblending processing methodology uses both acquisition and pre-processing preconditioning for optimum deblending. This deblending process has been successfully applied on a field test data set acquired when sources were operating at near-simultaneous times.

Figure 41:
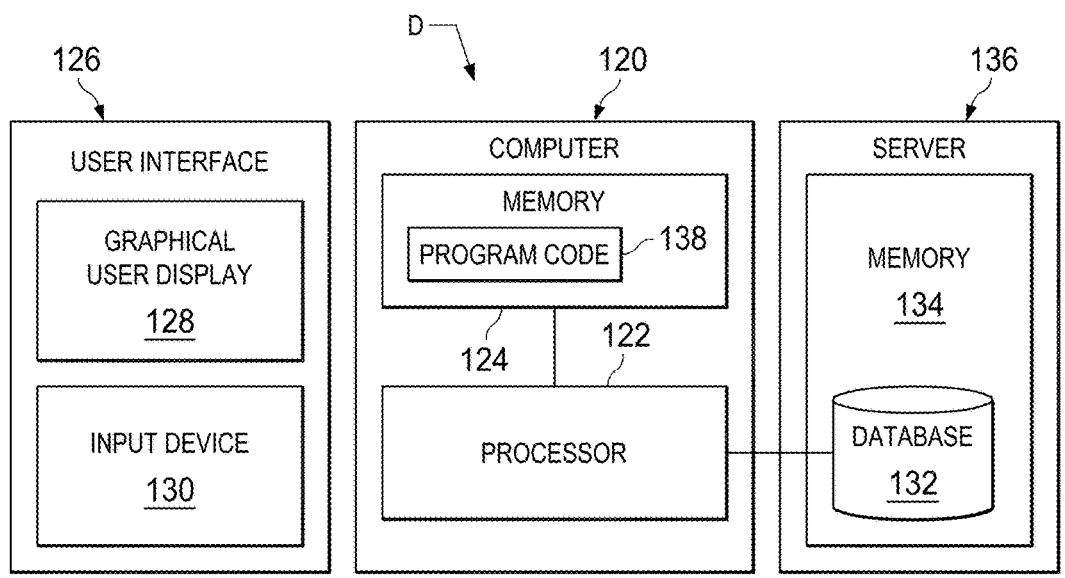
FIG. 41 is a schematic diagram of a computer system for crosstalk interference attenuation or reduction in survey data according to the present invention.

As illustrated in FIG. 41, a data processing system D according to the present invention includes the computer 120 having processor 122 and memory 124 coupled to the processor 122 to store operating instructions, control information and database records therein. The computer 120 may, if desired, be a portable digital processor, such as a personal computer in the form of a laptop computer, notebook computer or other suitable programmed or programmable digital data processing apparatus, such as a desktop computer. It should also be understood that the computer 120 may be a multicore processor with nodes such as those from Intel Corporation or Advanced Micro Devices (AMD), or a mainframe computer of any conventional type of suitable processing capacity such as those available from International Business Machines (IBM) of Armonk, N.Y. or other source.

The computer 120 has a user interface 126 and an output display 128 for displaying output data or records of processing of seismic data survey measurements performed according to the present invention for attenuation of crosstalk signal and surface wave interference in data from surveys conducted with independent simultaneous sources. The output display 128 includes components such as a printer and an output display screen capable of providing printed output information or visible displays in the form of graphs, data sheets, graphical images, data plots and the like as output records or images.

The user interface 126 of computer 120 also includes a suitable user input device or input/output control unit 130 to provide a user access to control or access information and database records and operate the computer 120. Data processing system D further includes a database 132 stored in computer memory, which may be internal memory 124, or an external, networked, or non-networked memory as indicated at 134 in an associated database server 136.

The data processing system D includes program code 138 stored in memory 124 of the computer 120. The program code 138, according to the present invention is in the form of computer operable instructions causing the data processor 122 to attenuate crosstalk signal and surface wave interference in data from surveys conducted with independent simultaneous sources according to the processing steps illustrated in FIG. 5 and described above.

It should be noted that program code 138 may be in the form of microcode, programs, routines, or symbolic computer operable languages that provide a specific set of ordered operations that control the functioning of the data processing system D and direct its operation. The instructions of program code 138 may be may be stored in memory 124 of the computer 120, or on computer diskette, magnetic tape, conventional hard disk drive, electronic read-only memory, optical storage device, or other appropriate data storage device having a computer usable medium stored thereon. Program code 138 may also be contained on a data storage device such as server 136 as a computer readable medium, as shown.

From the foregoing, it can be seen that the present invention provides a new dependent simultaneous swept frequency source survey design method to control the amount of crosstalk interference in both time and offset on source records. A command and control recording system can be used to implement time-distance rules between fleets but is not required in this new high-productivity acquisition time. The present invention inherently self-manages time and distance rules when fleets are limited to pre-assigned sectors and variable sweep lengths are assigned to different fleets. By using different sweep lengths along with variable distance separations, this guarantees a sparse interference pattern in the common receiver domain. This is the preferred domain for deblending with conventional time-frequency de-noising methods.

Time-distance rules between fleets are used to control the random initiation timing of frequency sweeps, and a minimum distance separation is imposed for simultaneous sweeps. Additional crosstalk interference attenuation is achieved by using unique linear sweeps for each survey source fleet. An added benefit of using variable sweep lengths is that the signal crosstalk noise is attenuated by 20 dB or greater than the cross-correlated record. The remaining crosstalk noises are guided wave modes which start out 40 dB greater than the signal. By using different sweep lengths, the signal crosstalk problem is avoided and it is only necessary we only need to focus on attenuating guided mode crosstalk waves. Using different sweep lengths with the same bandwidth for each dependent survey source fleet reduces the total energy of surface wave and signal crosstalk interference after cross-correlation by 30 dB and 20 dB, respectively.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention.

What is claimed is:

1. A method of land surveying of subsurface formations in an area of interest with a plurality of land survey fleets, each with a swept frequency seismic energy source emitting seismic energy for reception at a receiver spread of seismic energy receiver arrays in sectors of the area of interest, comprising the steps of:
    locating the swept frequency seismic energy sources in each of the land survey fleets in different assigned individual sectors across separate source swaths outside the receiver spread;
    concurrently emitting seismic energy in a common bandwidth from the swept frequency seismic energy sources by performing the steps of:
        operating the swept frequency seismic energy sources to perform linear frequency sweeps at frequencies for individual land survey fleets at different frequency ranges from the frequency ranges in the common bandwidth of the other land survey fleets;
        performing the linear frequency sweeps for the sources in the individual land survey fleets of the plurality of survey fleets for sweep lengths of different times from the other sources in the land survey fleets; and
    forming a blended seismic record of linear frequency sweeps from the concurrently operating land survey fleets at the receiver spread.

2. The method of claim 1, further including the step of: maintaining time-distance rules between the survey fleets during the survey.

3. The method of claim 1, further including the step of: maintaining minimum distance rules between the survey fleets during the survey.

4. The method of claim 1, wherein the linear frequency sweeps for the seismic energy sources in each of the plurality of land survey fleets for sweep lengths of differ in time from the other seismic energy sources by at least twice the two-way travel time to a subsurface formation of interest.

5. The method of claim 1, wherein the linear frequency sweeps in the sectors of the survey are performed in near-simultaneous time.

6. The method of claim 1, wherein frequencies for the frequency sweeps in the common bandwidth for the seismic energy sources in each of the land survey fleets overlap in part.

7. The method of claim 1, wherein the linear frequency sweeps for the sources in a sector of the survey are an increasing sweep and the linear frequency sweeps of an adjacent sector are a decreasing sweep.

* * * * *